(12) United States Patent
Matsuda et al.

(10) Patent No.: US 10,940,751 B2
(45) Date of Patent: Mar. 9, 2021

(54) ELECTRIC VEHICLE DRIVING DEVICE

(71) Applicant: Nsk Ltd., Tokyo (JP)

(72) Inventors: Yasuyuki Matsuda, Kanagawa (JP); Daisuke Gunji, Kanagawa (JP); Shin Yamamoto, Kanagawa (JP); Toshirou Toyoda, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/480,933

(22) PCT Filed: Jun. 5, 2018

(86) PCT No.: PCT/JP2018/021623
§ 371 (c)(1),
(2) Date: Jul. 25, 2019

(87) PCT Pub. No.: WO2019/031043
PCT Pub. Date: Feb. 14, 2019

(65) Prior Publication Data
US 2020/0384848 A1    Dec. 10, 2020

(30) Foreign Application Priority Data

Aug. 9, 2017  (JP) .............................. JP2017-154450

(51) Int. Cl.
*B60K 17/02* (2006.01)
*B60K 7/00* (2006.01)
(Continued)

(52) U.S. Cl.
CPC ............ *B60K 7/0007* (2013.01); *B60K 17/02* (2013.01); *B60K 17/046* (2013.01); *B60K 17/08* (2013.01);
(Continued)

(58) Field of Classification Search
CPC .......... F16H 3/728; H02K 7/006; H02K 7/10; H02K 7/116; B60K 7/0007; B60K 17/02; B60K 17/046; B60K 17/108
See application file for complete search history.

(56) References Cited

U.S. PATENT DOCUMENTS 6,537,167 B1    3/2003  Gazyakan et al.
7,475,611 B2 *  1/2009  Yang .................... B60K 7/0007
                                                      74/413
(Continued)

FOREIGN PATENT DOCUMENTS

JP    2005033854 A    2/2005
JP    2005-329817 A   12/2005
(Continued)

OTHER PUBLICATIONS

International Search Report, dated Aug. 21, 2018 from the International Bureau in counterpart International application No. PCT/JP2018/021613.
(Continued)

*Primary Examiner* — John D Walters
*Assistant Examiner* — James J Triggs
(74) *Attorney, Agent, or Firm* — Sughrue Mion, PLLC

(57) ABSTRACT

An electric vehicle driving device includes a first motor, a second motor, a transmission device to which power of at least one of the first motor and the second motor is transmitted, and an output member that rotates with power output from the transmission device. A rotation axis of the first motor, a rotation axis of the second motor, and a rotation axis of the transmission device are arranged in parallel to a rotation axis of the output member. When seen from an axial direction parallel to the rotation axis of the output member, the rotation axis of the first motor is located on one side of a straight line passing through the rotation axis of the output member and the rotation axis of the transmission device and (Continued)

the rotation axis of the second motor is located on the other side of the straight line.

12 Claims, 20 Drawing Sheets

(51) Int. Cl.
    *B60K 17/04*     (2006.01)
    *B60K 17/08*     (2006.01)
    *F16H 3/72*     (2006.01)
    *H02K 7/00*     (2006.01)
    *H02K 7/108*     (2006.01)
    *H02K 7/116*     (2006.01)
    *F16D 41/00*     (2006.01)

(52) U.S. Cl.
    CPC ............. *F16H 3/725* (2013.01); *F16H 3/728* (2013.01); *H02K 7/006* (2013.01); *H02K 7/108* (2013.01); *H02K 7/116* (2013.01); *B60K 2007/003* (2013.01); *B60K 2007/0038* (2013.01); *B60K 2007/0061* (2013.01); *F16D 41/00* (2013.01); *F16H 2200/0021* (2013.01); *F16H 2200/2007* (2013.01); *F16H 2200/2084* (2013.01); *F16H 2200/2094* (2013.01)

(56) References Cited

U.S. PATENT DOCUMENTS

| | | | | |
|---|---|---|---|---|
| 8,382,629 B2* | 2/2013 | Hirata | ....................... | F16H 1/32 |
| | | | | 475/162 |
| 8,790,204 B2* | 7/2014 | Gunji | ................. | F16H 37/0826 |
| | | | | 475/5 |
| 8,888,636 B2* | 11/2014 | Ikegami | .................. | F16H 3/725 |
| | | | | 475/5 |
| 8,915,818 B2* | 12/2014 | Gunji | .................. | B60B 27/0021 |
| | | | | 475/150 |
| 2013/0267365 A1 | 10/2013 | Gunji et al. | | |
| 2014/0015382 A1* | 1/2014 | Kim | ........................ | H02K 7/14 |
| | | | | 310/67 R |
| 2015/0300461 A1* | 10/2015 | Tamai | .................... | B60K 6/365 |
| | | | | 475/5 |
| 2016/0193908 A1* | 7/2016 | Kanada | .................. | B60K 6/405 |
| | | | | 475/5 |

FOREIGN PATENT DOCUMENTS

| | | |
|---|---|---|
| JP | 2008-221921 A | 9/2008 |
| JP | 2012-183981 A | 9/2012 |
| JP | 2013-032804 A | 2/2013 |
| JP | 2013-209074 A | 10/2013 |
| JP | 2014-019373 A | 2/2014 |
| WO | 2012131953 A1 | 10/2012 |
| WO | 2019031043 A1 | 2/2019 |

OTHER PUBLICATIONS

Nihon Keizai Shimbun, "EV NSK The thin motor trial production", An electronic edition, Nihon Keizai Shimbun [on-line], Oct. 12, 2017, pp. 1-4, Japan.
"Wheel hub motor fit cut model NSK NSK Tokyo Motor Show 2017 The report", URL, https://www.nikkei.com/article/DGXMZO22163500S7A011C1XD2000/ODDEYE109, Nov. 24, 2017, pp. 1-18.
International Search Report for PCT/JP2018/021623 dated Sep. 4, 2018 [PCT/ISA/210].

* cited by examiner

ELECTRIC VEHICLE DRIVING DEVICE

CROSS REFERENCE TO RELATED APPLICATIONS

This application is a National Stage of International Application No. PCT/JP2018/021623 filed Jun. 5, 2018, claiming priority based on Japanese Patent Application No. 2017-154450 filed Aug. 9, 2017.

FIELD

The present invention relates to an electric vehicle driving device.

BACKGROUND

A driving device that operates with electric power supplied from a battery or the like is mounted on electric vehicles such as electric automobiles. In starting or climbing, relatively large torque is required but the traveling speed of the vehicle is relatively low. On the other hand, in cruising on flat roads, small torque is required but the traveling speed of the vehicle is relatively high. To cope with this, Patent Literature 1, for example, describes an in-wheel motor that includes a transmission device.

CITATION LIST

Patent Literature

Patent Literature 1: Japanese Patent Application Laid-open No. 2013-32804A

SUMMARY

Technical Problem

The driving device that is used for the electric vehicle needs to be reduced in size in the axial direction in some cases. When the driving device described in Patent Literature 1 is used, size reduction thereof in the axial direction has a limit.

The present invention has been made in view of the above-described circumstances and an object thereof is to provide an electric vehicle driving device capable of shifting gear and being reduced in length in the axial direction.

Solution to Problem

To achieve the above object, an electric vehicle driving device according to the present invention includes a first motor, a second motor, a transmission device to which power of at least one of the first motor and the second motor is transmitted, the transmission device being able to change a reduction ratio, and an output member that rotates with power output from the transmission device. A rotation axis of the first motor, a rotation axis of the second motor, and a rotation axis of the transmission device are arranged in parallel to a rotation axis of the output member, and when seen from an axial direction parallel to the rotation axis of the output member, a position of the rotation axis of the first motor, a position of the rotation axis of the second motor, a position of the rotation axis of the transmission device, and a position of the rotation axis of the output member differ from each other, and the rotation axis of the first motor is located on one side of a straight line passing through the rotation axis of the output member and the rotation axis of the transmission device and the rotation axis of the second motor is located on the other side of the straight line.

With this configuration, a position of the rotation axis of the first motor and a position of the rotation axis of the second motor differ from each other. The second motor can therefore be arranged so as not to overlap with the first motor in the axial direction. A position of the rotation axis of the transmission device differs from the position of the rotation axis of the first motor and the position of the rotation axis of the second motor. The transmission device can therefore be arranged so as not to overlap with the first motor and the second motor in the axial direction. Accordingly, the electric vehicle driving device can shift gear and be reduced in length in the axial direction.

As an embodiment of the above electric vehicle driving device, it is desirable to include a connector for mounting wiring for supplying electric power to the first motor and the second motor. When seen from the axial direction, the connector is located in a smaller region of two regions partitioned by a first half line passing through the rotation axis of the first motor with the rotation axis of the output member serving as an end point and a second half line passing through the rotation axis of the second motor with the rotation axis of the output member serving as an end point.

The transmission device is arranged in a larger region of the two regions partitioned by the first half line and the second half line. It is therefore difficult to arrange wiring toward the first motor and the second motor from the connector in the larger region because a space in which the wiring can be provided is small. In consideration of this, when the connector is located in the smaller region, the wiring is easily arranged because obstacles to the wiring are reduced. Furthermore, difference between a distance to the first motor from the connector and a distance to the second motor from the connector can be reduced.

As an embodiment of the above electric vehicle driving device, it is desirable to include a first reduction gear that amplifies torque generated in the first motor and transmits the torque to the transmission device, and a second reduction gear that amplifies torque generated in the second motor and transmits the torque to the transmission device.

In the electric vehicle driving device, the outer diameters of the first motor and the second motor are reduced whereas the second motor does not overlap with the first motor in the axial direction. Increase in torques that the first motor and the second motor output has a limit. To cope with the limit, torque that is transmitted to the transmission device can be increased by providing the first reduction gear and the second reduction gear in the electric vehicle driving device. Accordingly, the electric vehicle driving device can be reduced in length in the axial direction and increase the torque capable of being output.

Advantageous Effects of Invention

The present invention can provide an electric vehicle driving device capable of shifting gear and being reduced in length in the axial direction.

DESCRIPTION OF EMBODIMENTS

Hereinafter, the present invention will be described in detail with reference to the drawings. It should be noted that the present invention is not limited by the following modes for carrying out the invention (hereinafter, referred to as embodiments). Components in the following embodiments include components that those skilled in the art can easily suppose and substantially the same components being components in a what-is-called equivalent range. Furthermore, the components that are disclosed in the following embodiments can be appropriately combined.

Figure 1:
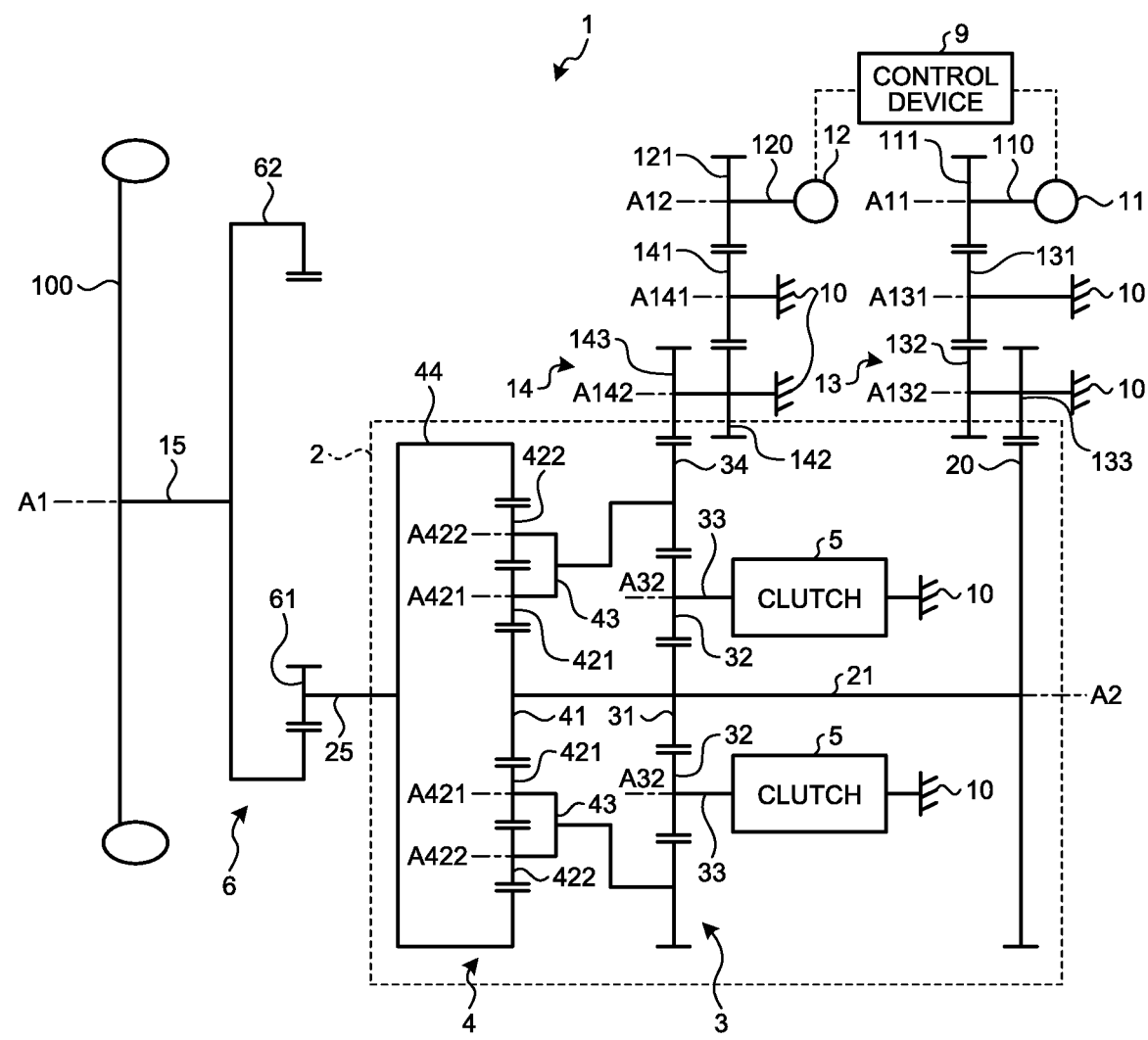
FIG. 1 is a schematic view of an electric vehicle driving device according to an embodiment.

FIG. 1 is a schematic view of an electric vehicle driving device according to the embodiment. An electric vehicle driving device 1 is a device for rotating a wheel 100 of a vehicle, for example. As illustrated in FIG. 1, the electric vehicle driving device 1 includes a case 10, a first motor 11, a first reduction gear 13, a second motor 12, a second reduction gear 14, a transmission device 2, a final reduction gear 6, an output member 15, and a control device 9.

The first motor 11 is connected to the transmission device 2 with the first reduction gear 13 interposed therebetween. The first reduction gear 13 increases torque that the first motor 11 outputs and transmits it to the transmission device 2. The first reduction gear 13, for example, doubles the torque that the first motor 11 outputs and transmits it to the transmission device 2. Maximum torque of the first motor 11 is, for example, 25 (Nm). Maximum torque that is transmitted to the transmission device 2 from the first reduction gear 13 is therefore 50 (Nm).

The first reduction gear 13 includes a first gear 131, a second gear 132, and a third gear 133. A first motor gear 111 mounted on a first shaft 110 of the first motor 11 is engaged with the first gear 131. The first gear 131 is engaged with the second gear 132. The third gear 133 is a gear coaxial with the second gear 132 and rotates together with the second gear 132. The third gear 133 is engaged with an input gear 20 of the transmission device 2.

The second motor 12 is connected to the transmission device 2 with the second reduction gear 14 interposed therebetween. The second reduction gear 14 increases torque that the second motor 12 outputs and transmits it to the transmission device 2. The second reduction gear 14, for example, doubles the torque that the second motor 12 outputs and transmits it to the transmission device 2. Maximum torque of the second motor 12 is, for example, 25 (Nm). Maximum torque that is transmitted to the transmission device 2 from the second reduction gear 14 is therefore 50 (Nm).

The second reduction gear 14 includes a first gear 141, a second gear 142, and a third gear 143. A second motor gear 121 mounted on a second shaft 120 of the second motor 12 is engaged with the first gear 141. The first gear 141 is engaged with the second gear 142. The third gear 143 is a gear coaxial with the second gear 142 and rotates together with the second gear 142. The third gear 143 is engaged with a first ring gear 34 of the transmission device 2. The first ring gear 34 has teeth on both of an outer circumferential surface and an inner circumferential surface. That is to say, the first ring gear 34 is an external gear and an internal gear. The third gear 143 is engaged with the teeth on the outer circumferential surface of the first ring gear 34. In other words, the third gear 143 is engaged with the first ring gear 34 as the external gear.

As illustrated in FIG. 1, the transmission device 2 includes the input gear 20, a sun gear shaft 21, a first planetary gear device 3, a second planetary gear device 4, a clutch 5, and a transmission device output shaft 25. The transmission device 2 can change a reduction ratio (ratio of torque that the transmission device 2 outputs relative to torque that is input to the transmission device 2).

The input gear 20 receives torque from the third gear 133 of the first reduction gear 13. The sun gear shaft 21 is coupled to the input gear 20. When the first motor 11 is driven, the input gear 20 and the sun gear shaft 21 rotate about a rotation axis A2.

The first planetary gear device 3 is, for example, a single pinion-type planetary gear device. The first planetary gear device 3 includes a first sun gear 31, first pinion gears 32, a first carrier 33, and the first ring gear 34.

The first sun gear 31 is coupled to the sun gear shaft 21. The first sun gear 31 rotates about the rotation axis A2 together with the sun gear shaft 21. The first sun gear 31 is engaged with the first pinion gears 32. The number of teeth of the first sun gear 31 is, for example, 24. The number of teeth of the first pinion gears 32 is, for example, 25.

The first carrier 33 is supported on the case 10 with the clutch 5 interposed therebetween. The first carrier 33 supports the first pinion gears 32 such that the first pinion gears 32 can rotate about rotating axes A32. The rotating axes A32 are arranged in parallel to the rotation axis A2. The first carrier 33 supports the first pinion gears 32 such that the first pinion gears 32 can revolve about the rotation axis A2. The first pinion gears 32 are engaged with the teeth on the inner circumferential surface of the first ring gear 34. In other words, the first pinion gears 32 are engaged with the first ring gear 34 as the internal gear. The first ring gear 34 rotates about the rotation axis A2. The number of teeth of the first ring gear 34 is, for example, 76.

The clutch 5 is, for example, a one-way clutch. The clutch 5 transmits only torque in a first direction and does not transmit torque in a second direction as an opposite direction to the first direction. The clutch 5 is arranged between the case 10 and the first carrier 33. The clutch 5 can restrict rotation of the first carrier 33. To be specific, the clutch 5 can switch between an engaged state restricting revolution of the first carrier 33 and a separated state permitting the revolution of the first carrier 33. That is to say, the clutch 5 enables the first carrier 33 to be rotatable in a specific direction relative to the case 10 and enables the first carrier 33 to be non-rotatable in a direction opposite to the specific direction relative to the case 10.

The second planetary gear device 4 is, for example, a double pinion-type planetary gear device. The second planetary gear device 4 includes a second sun gear 41, second pinion gears 421, third pinion gears 422, a second carrier 43, and a second ring gear 44.

The second sun gear 41 is coupled to the sun gear shaft 21. The second sun gear 41 rotates about the rotation axis A2 together with the sun gear shaft 21. The second pinion gears 421 are engaged with the second sun gear 41. The third pinion gears 422 are engaged with the second pinion gears 421. The number of teeth of the second sun gear 41 is, for example, 47. The number of teeth of the second pinion gears 421 is, for example, 20. The number of teeth of the third pinion gears 422 is, for example, 19.

The second carrier 43 is coupled to the first ring gear 34. The second carrier 43 supports the second pinion gears 421 such that the second pinion gears 421 can rotate about rotating axes A421. The second carrier 43 supports the third pinion gears 422 such that the third pinion gears 422 can rotate about rotating axes A422. The rotating axes A421 and the rotating axes A422 are arranged in parallel to the rotation axis A2. The second carrier 43 supports the second pinion gears 421 and the third pinion gears 422 such that the second pinion gears 421 and the third pinion gears 422 can revolve about the rotation axis A2. The second ring gear 44 is engaged with the third pinion gears 422. The second ring gear 44 rotates about the rotation axis A2. The second ring gear 44 is coupled to the transmission device output shaft 25. The number of teeth of the second ring gear 44 is, for example, 97.

The final reduction gear 6 is arranged between the transmission device 2 and the wheel 100 of the vehicle. The final reduction gear 6 increases the torque that is input to the transmission device output shaft 25 and outputs it to the output member 15. The final reduction gear 6 includes a fourth pinion gear 61 and a third ring gear 62. The fourth pinion gear 61 is coupled to the transmission device output shaft 25 and rotates about the rotation axis A2 together with the transmission device output shaft 25. The fourth pinion gear 61 is engaged with the third ring gear 62. The third ring gear 62 rotates about a rotation axis A1. The third ring gear 62 is coupled to the output member 15. The output member 15 is coupled to the wheel 100. The output member 15 and the wheel 100 rotate about the rotation axis A1 together with the third ring gear 62. A rotation axis A11 of the first motor 11, a rotation axis A12 of the second motor 12, and the rotation axis A2 of the transmission device 2 are arranged in parallel to the rotation axis A1 of the output member 15.

Power generated in at least one of the first motor 11 and the second motor 12 is transmitted to the wheel 100 through the transmission device 2 and the final reduction gear 6. When the vehicle travels on a downward slope or the like, power generated in the wheel 100 is transmitted to at least one of the first motor 11 and the second motor 12 through the final reduction gear 6 and the transmission device 2. In this case, at least one of the first motor 11 and the second motor 12 is driven as a power generator. Rotation resistance in power generation acts on the vehicle as a regenerative brake.

The control device 9 is a computer and includes, for example, a central processing unit (CPU), a read only memory (ROM), a random access memory (RAM), an input interface, and an output interface. The control device 9 is, for example, an electronic control unit (ECU) mounted on the vehicle. The control device 9 controls the angular velocities and rotating directions of the first motor 11 and the second motor 12.

Figure 2:
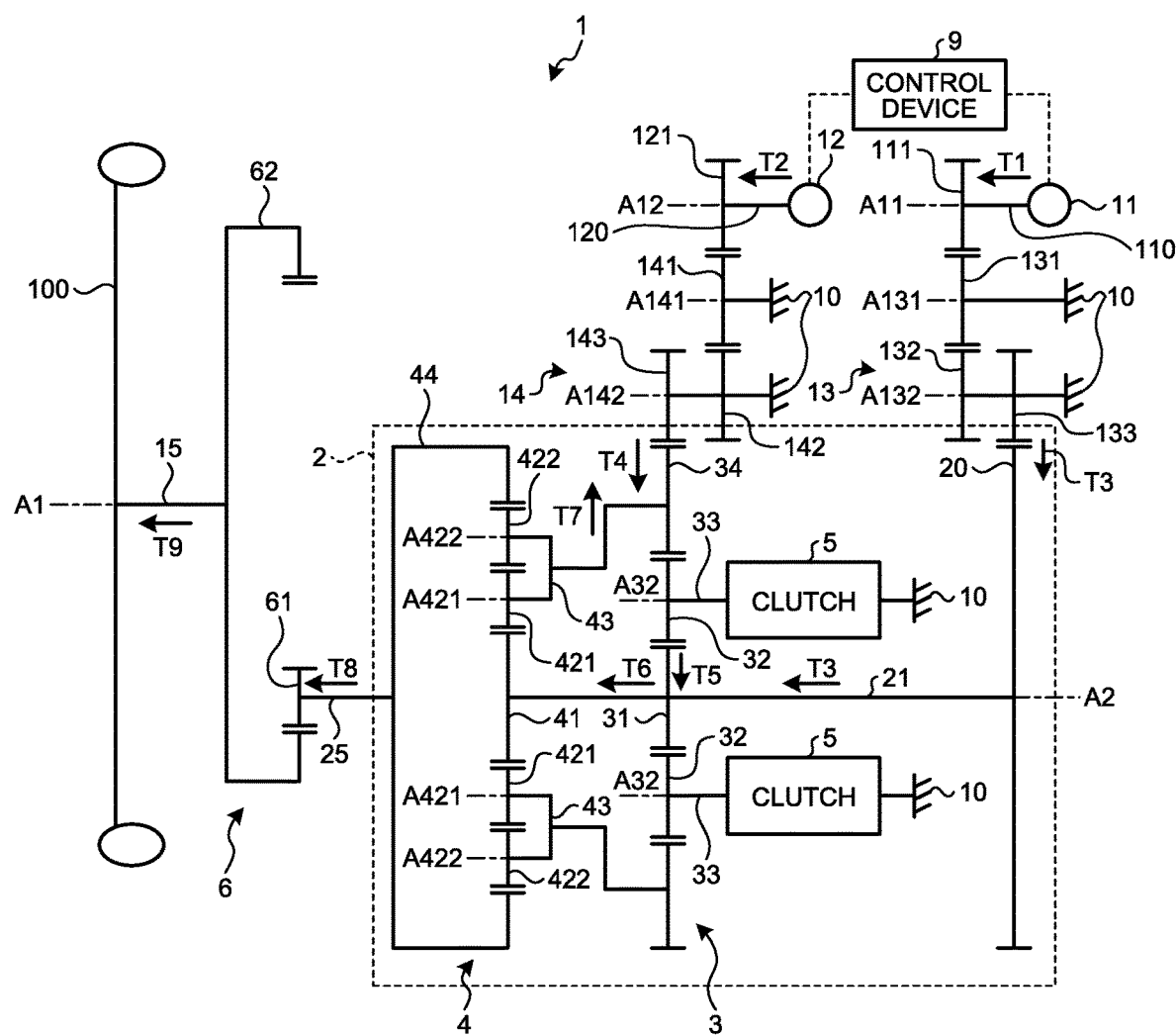
FIG. 2 is a schematic view illustrating a path through which torque is transmitted in a low gear mode.
Figure 3:
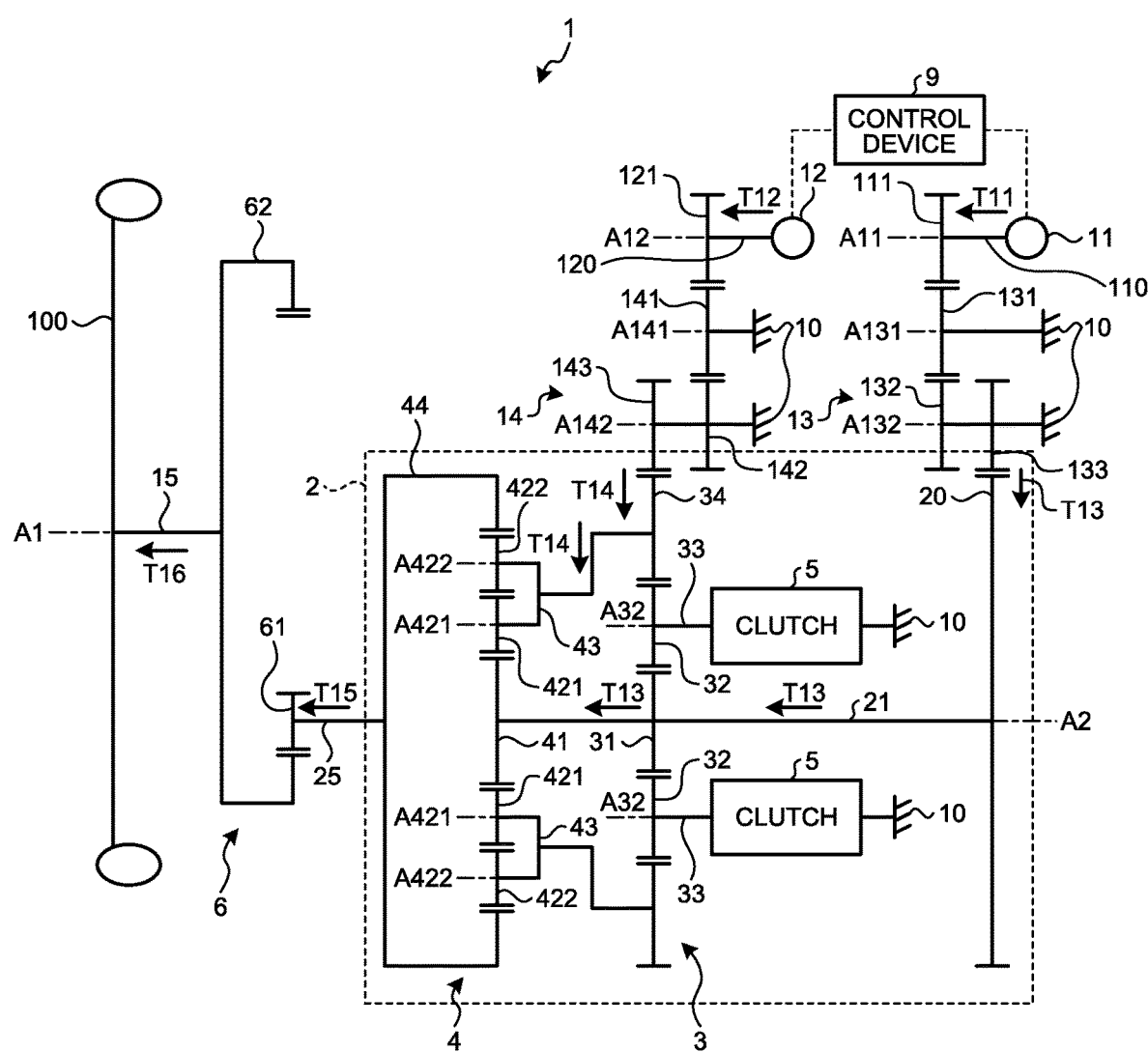
FIG. 3 is a schematic view illustrating a path through which torque is transmitted in a high gear mode.

FIG. 2 is a schematic view illustrating a path through which torque is transmitted in a low gear mode. FIG. 3 is a schematic view illustrating a path through which torque is transmitted in a high gear mode. The electric vehicle driving device 1 has the low gear mode and the high gear mode as driving modes. The driving mode is switched in accordance with the angular velocities of the first motor 11 and the second motor 12. That is to say, when the first motor 11 and the second motor 12 are controlled such that torque in the first direction is applied to the first carrier 33, the clutch 5 is made into the engaged state and the drive mode is made into the low gear mode. When the first motor 11 and the second motor 12 are controlled such that torque in the second direction is applied to the first carrier 33, the clutch 5 is made into the separated state and the drive mode is made into the high gear mode.

The reduction ratio can be increased in the low gear mode. That is to say, the torque that is transmitted to the transmission device output shaft 25 is increased in the low gear mode. The low gear mode is used mainly when the vehicle needs large torque. The large torque is needed in, for example, climbing or acceleration.

The directions of the torques that are generated in the first motor 11 and the second motor 12 are opposite to each other in the low gear mode. The magnitudes of the torques that are generated in the first motor 11 and the second motor 12 may be the same as or differ from each other. The torque generated in the first motor 11 is input to the first sun gear 31 through the first reduction gear 13, the input gear 20, and the sun gear shaft 21. The torque generated in the second motor 12 is input to the first ring gear 34 through the second reduction gear 14. The clutch 5 is made into the engaged state in the low gear mode. That is to say, the first pinion gears 32 can rotate but cannot revolve in the low gear mode.

The torque that the first motor 11 outputs is assumed to be torque T1 and the torque that the second motor 12 outputs is assumed to be torque T2 in the low gear mode. The direction of the torque T2 is opposite to the direction of the torque T1. The torque T1 output from the first motor 11 becomes torque T3 when passing through the first reduction gear 13. The torque T3 is input to the first sun gear 31 through the sun gear shaft 21. The torque T3 becomes torque T6 when merging with the torque T5 in the first sun gear 31. The torque T5 is transmitted to the first sun gear 31 from the first ring gear 34.

The first sun gear 31 and the second sun gear 41 are coupled to each other with the sun gear shaft 21. The torque T6 output from the first sun gear 31 is transmitted to the second sun gear 41 through the sun gear shaft 21 in the low gear mode. The second planetary gear device 4 amplifies the torque T6. The second planetary gear device 4 distributes the torque T6 into torque T8 and torque T7. The torque T8 is torque of the torque T2 that has been distributed to the second ring gear 44 and is output from the transmission device output shaft 25. The torque T7 is torque of the torque T2 that has been distributed to the second carrier 43.

The torque T8 is output to the final reduction gear 6 from the transmission device output shaft 25. The final reduction gear 6 amplifies the torque T8 to turn it into torque T9. The torque T9 is output to the wheel 100 through the output member 15. As a result, the vehicle travels.

The second carrier 43 and the first ring gear 34 rotate integrally. The torque T7 distributed to the second carrier 43 is combined with the torque T4 output from the second reduction gear 14 in the first ring gear 34. The torque T4 and the torque T7 combined in the first ring gear 34 become the torque T5 through the first pinion gears 32. Thus, the transmission device 2 can increase the reduction ratio because the torque circulates between the first planetary gear device 3 and the second planetary gear device 4. That is to say, the electric vehicle driving device 1 can generate large torque in the low gear mode.

The reduction ratio can be decreased in the high gear mode. The torque that is transmitted to the transmission device output shaft 25 is decreased but friction loss of the transmission device 2 is decreased in the high gear mode. The directions of the torques that are generated in the first motor 11 and the second motor 12 are the same in the high gear mode. The magnitudes of the torques that are generated in the first motor 11 and the second motor 12 are substantially the same. The torque that the first motor 11 outputs is assumed to be torque T11 and the torque that the second motor 12 outputs is assumed to be torque T12 in the high gear mode. Torque T15 illustrated in FIG. 3 is torque that is output from the transmission device output shaft 25 and is transmitted to the final reduction gear 6.

The torque T11 of the first motor 11 becomes torque T13 when passing through the first reduction gear 13 in the high gear mode. The torque T12 of the second motor 12 becomes torque T14 when passing through the second reduction gear 14. The clutch 5 is made into the separated state in the high gear mode. That is to say, the first pinion gears 32 can rotate and revolve in the high gear mode. With the separated state of the clutch 5, the circulation of the torque between the first planetary gear device 3 and the second planetary gear device 4 is blocked in the high gear mode. The first carrier 33 can revolve in the high gear mode, so that the first sun gear 31 and the first ring gear 34 can rotate relatively freely. The torque T13 merges with the torque T14 in the second carrier 43. As a result, the torque T15 is transmitted to the second ring gear 44.

The torque T15 is output to the final reduction gear 6 from the transmission device output shaft 25. The final reduction gear 6 amplifies the torque T15 to turn it into torque T16. The torque T16 is output to the wheel 100 through the output member 15. As a result, the vehicle travels. In the high gear mode, the control device 9 appropriately controls the angular velocity of the first motor 11 and the angular velocity of the second motor 12, so that the direction of the torque T16 is reversed. As a result, the vehicle travels backward.

Figure 4:
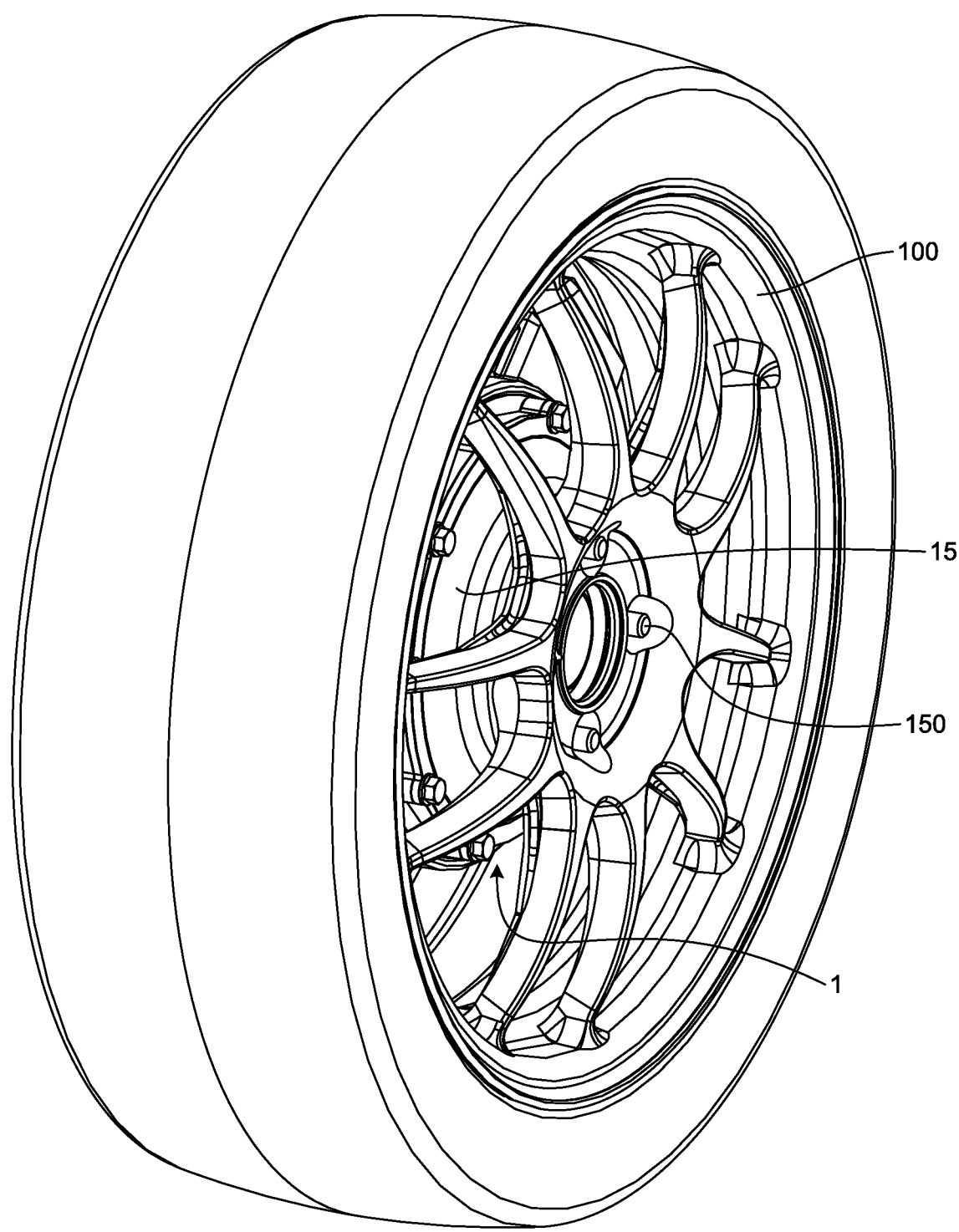
FIG. 4 is a perspective view of a wheel on which the electric vehicle driving device in the embodiment is mounted.
Figure 5:
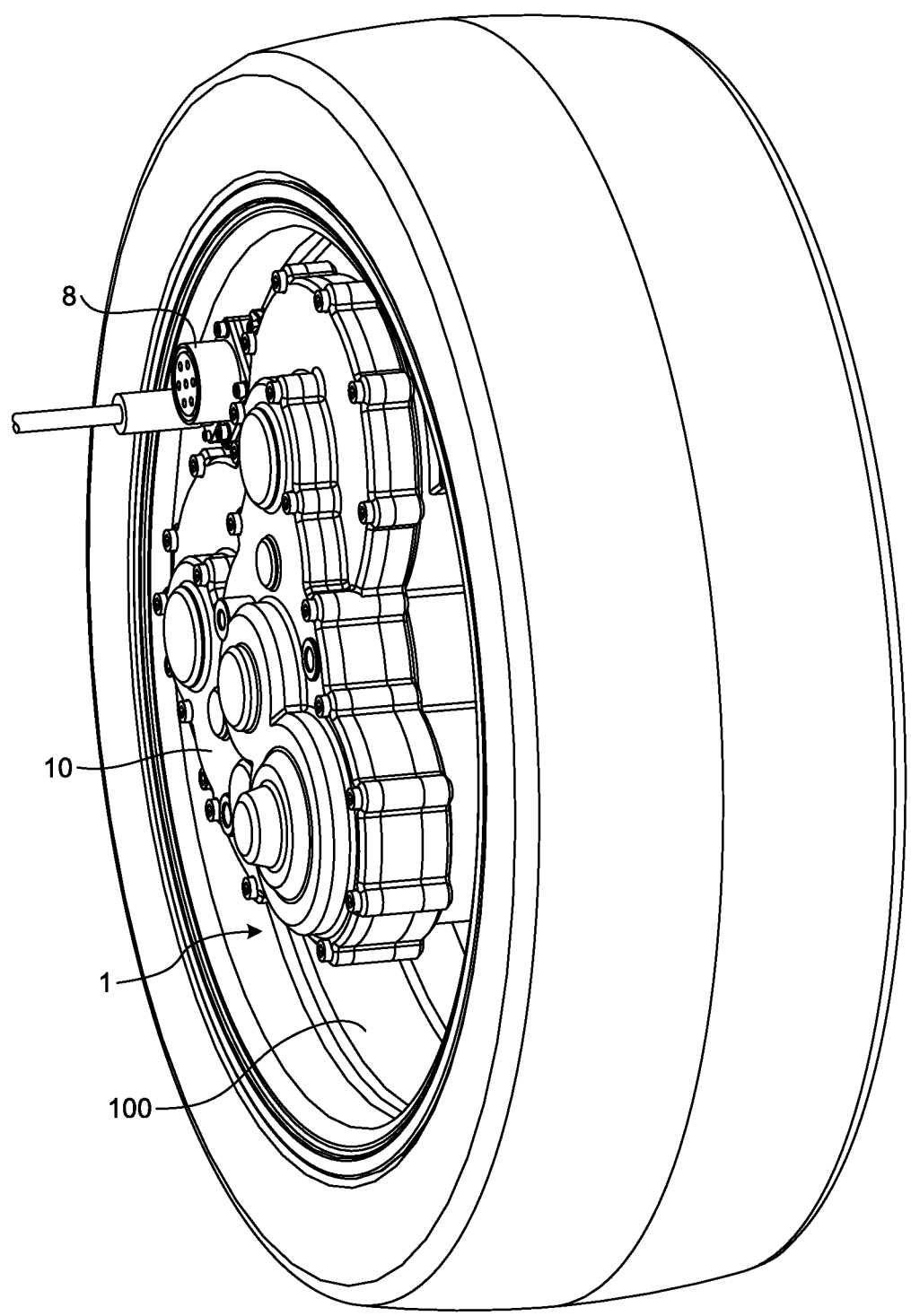
FIG. 5 is a perspective view of the wheel on which the electric vehicle driving device in the embodiment is mounted.
Figure 6:
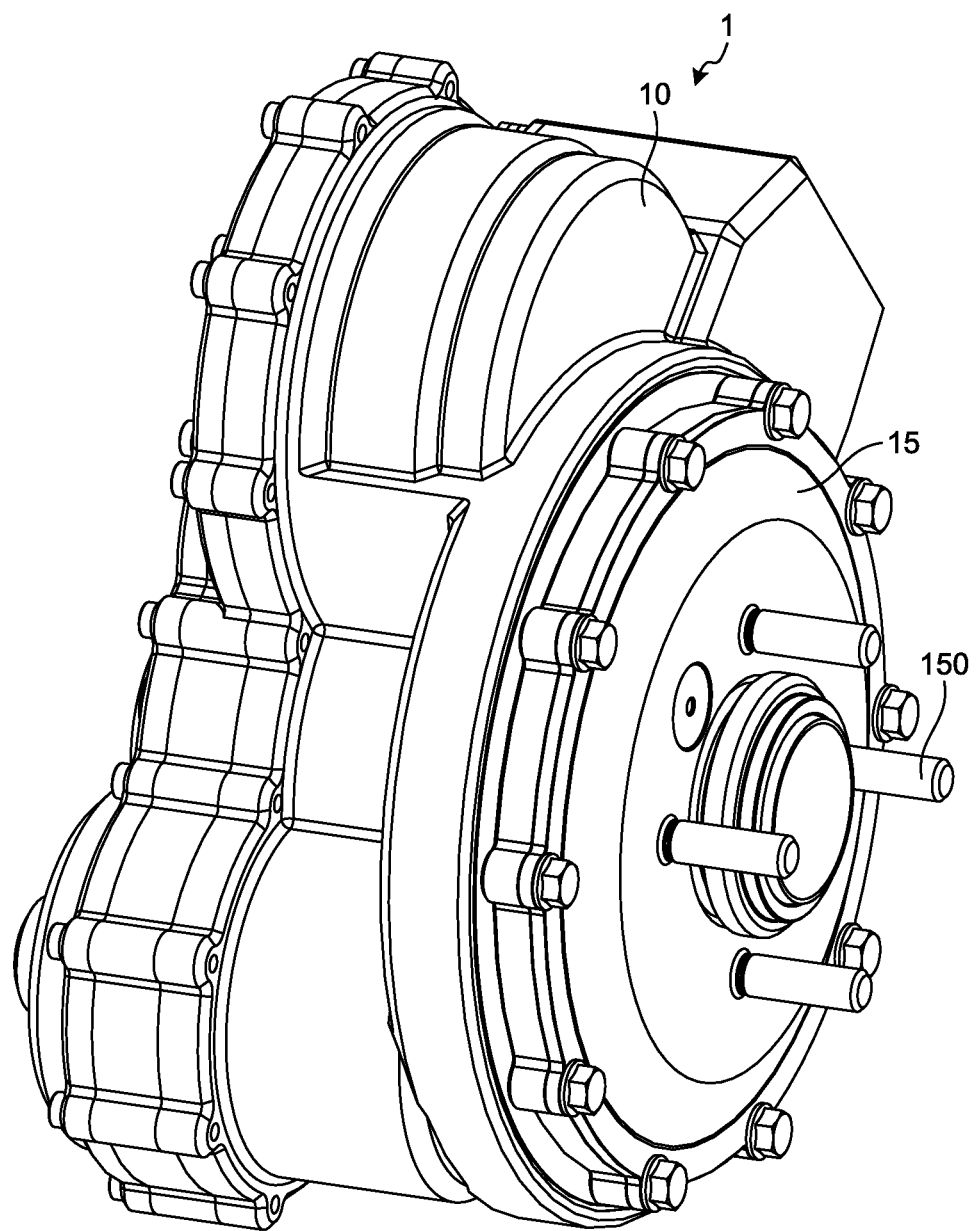
FIG. 6 is a perspective view of the electric vehicle driving device in the embodiment.
Figure 7:
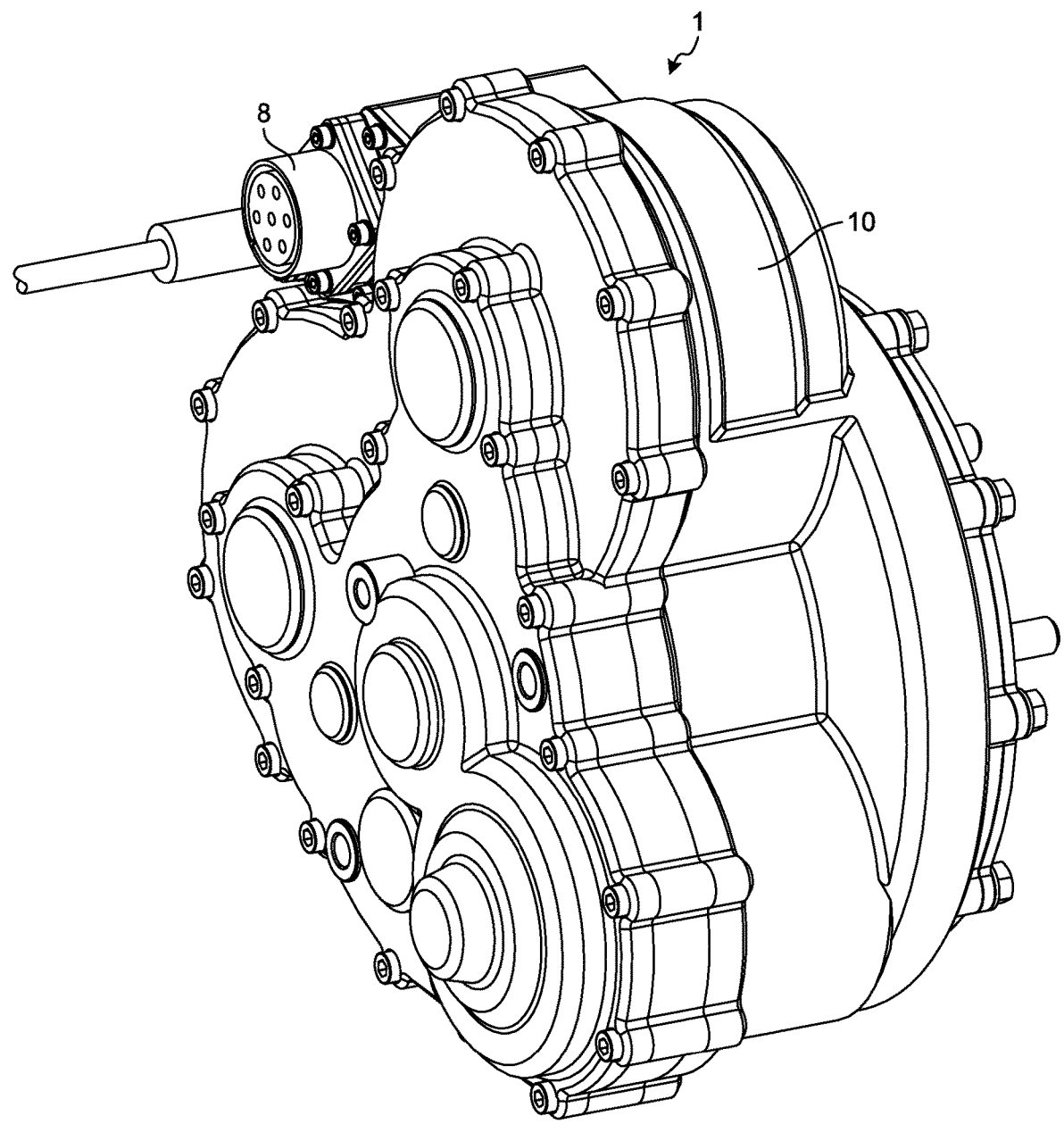
FIG. 7 is a perspective view of the electric vehicle driving device in the embodiment.
Figure 8:
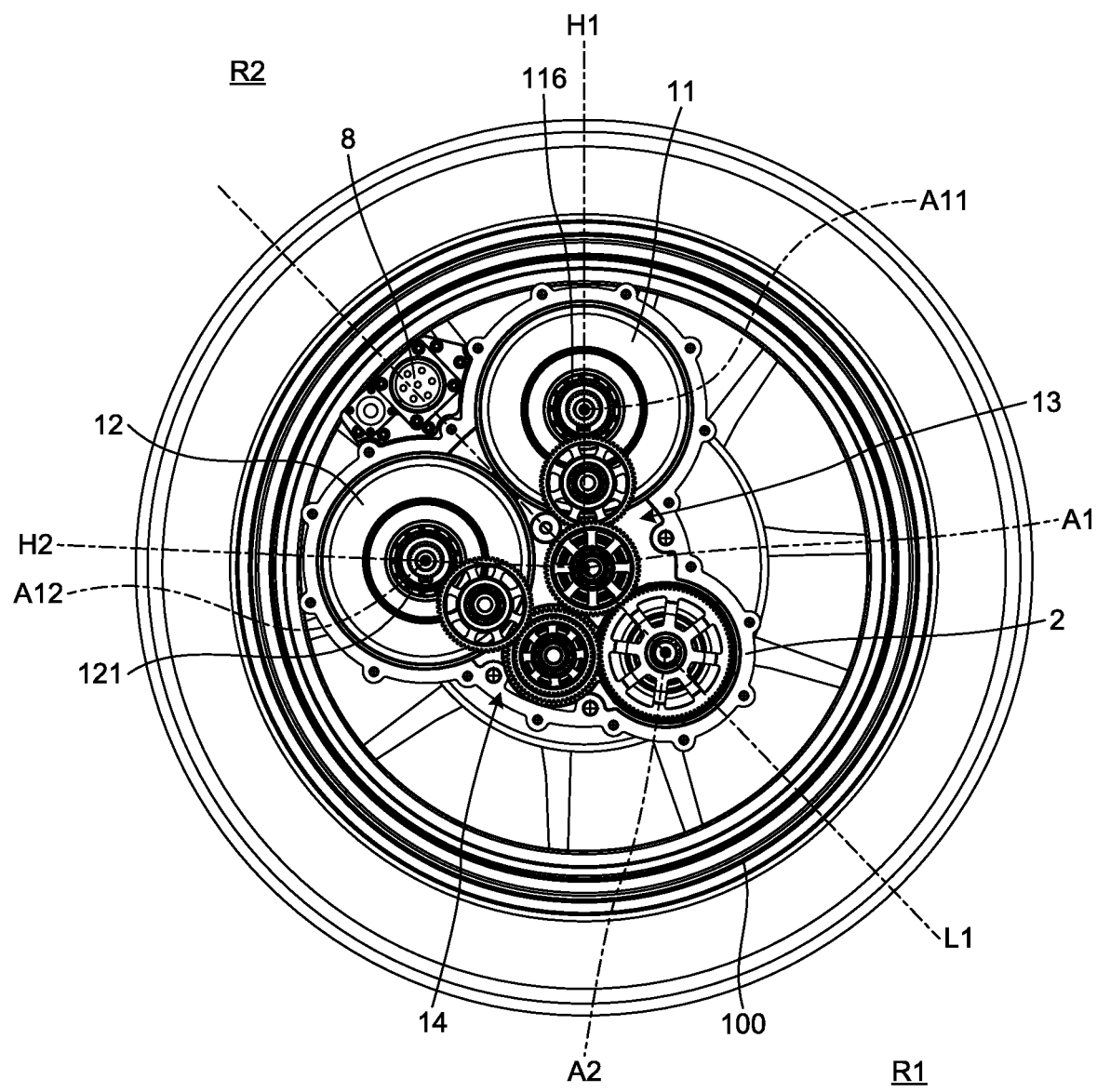
FIG. 8 is a front view of the electric vehicle driving device in the embodiment.
Figure 9:
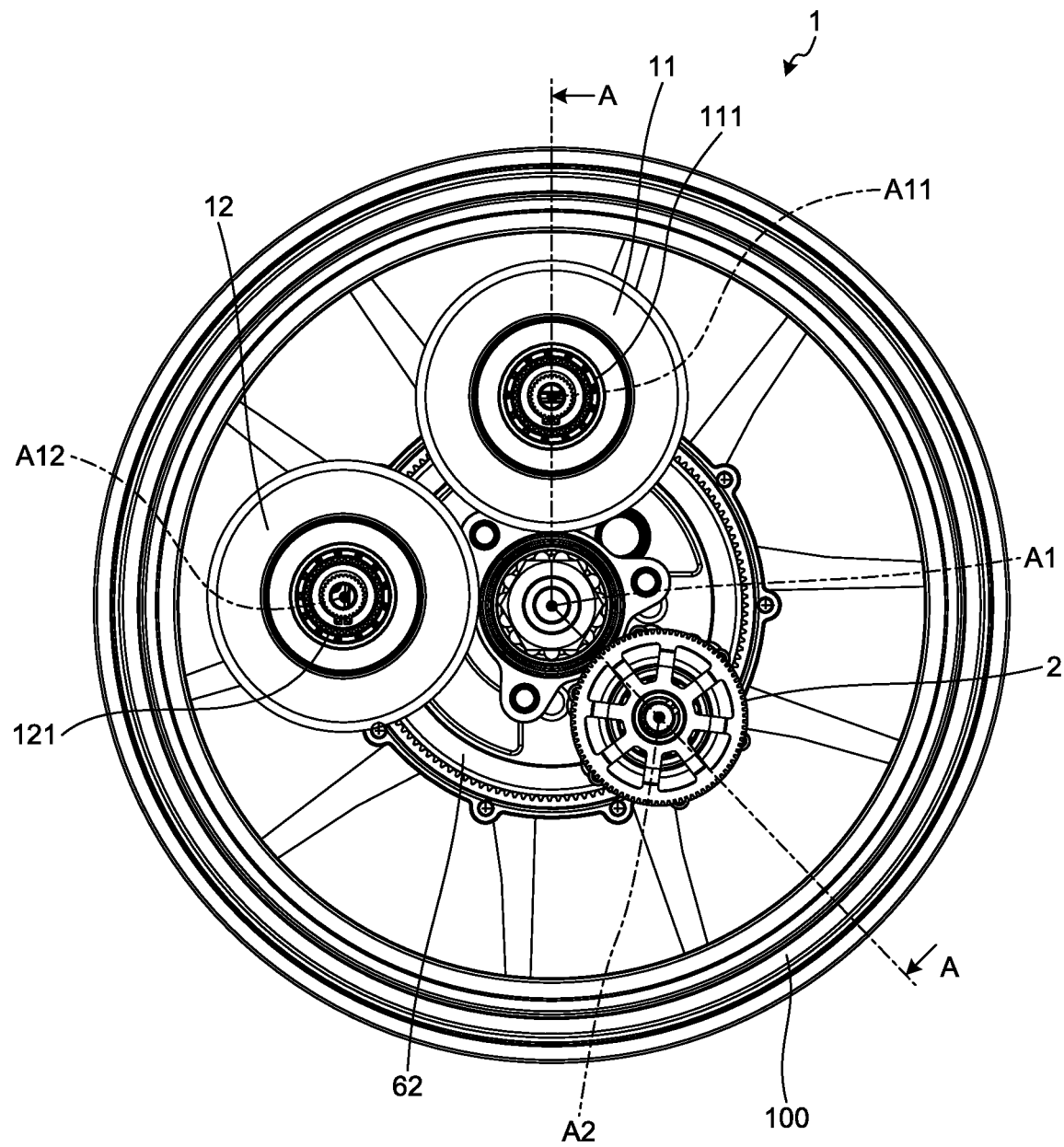
FIG. 9 is a front view of the electric vehicle driving device in the embodiment.
Figure 10:
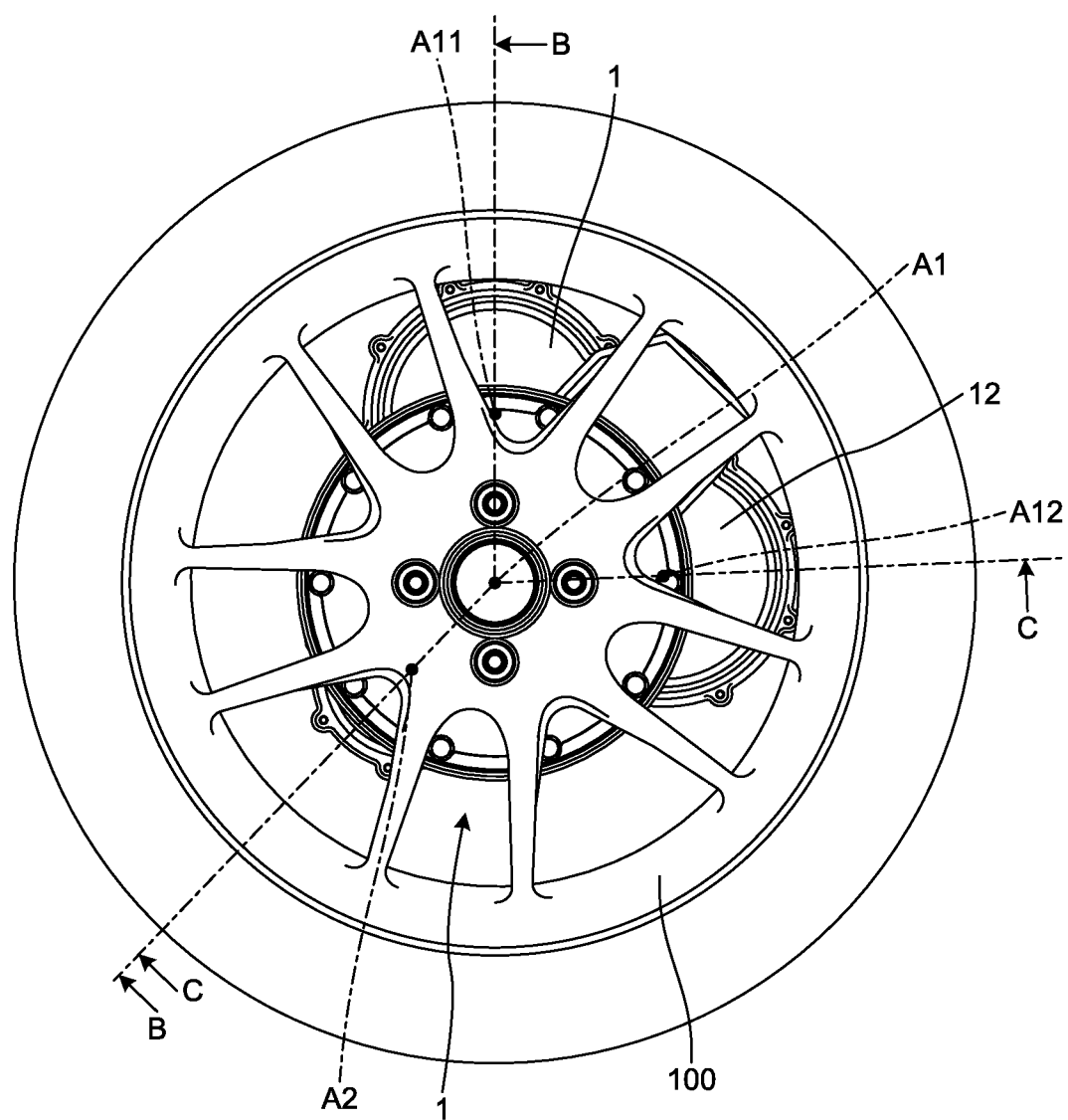
FIG. 10 is a rear view of the electric vehicle driving device in the embodiment.
Figure 11:
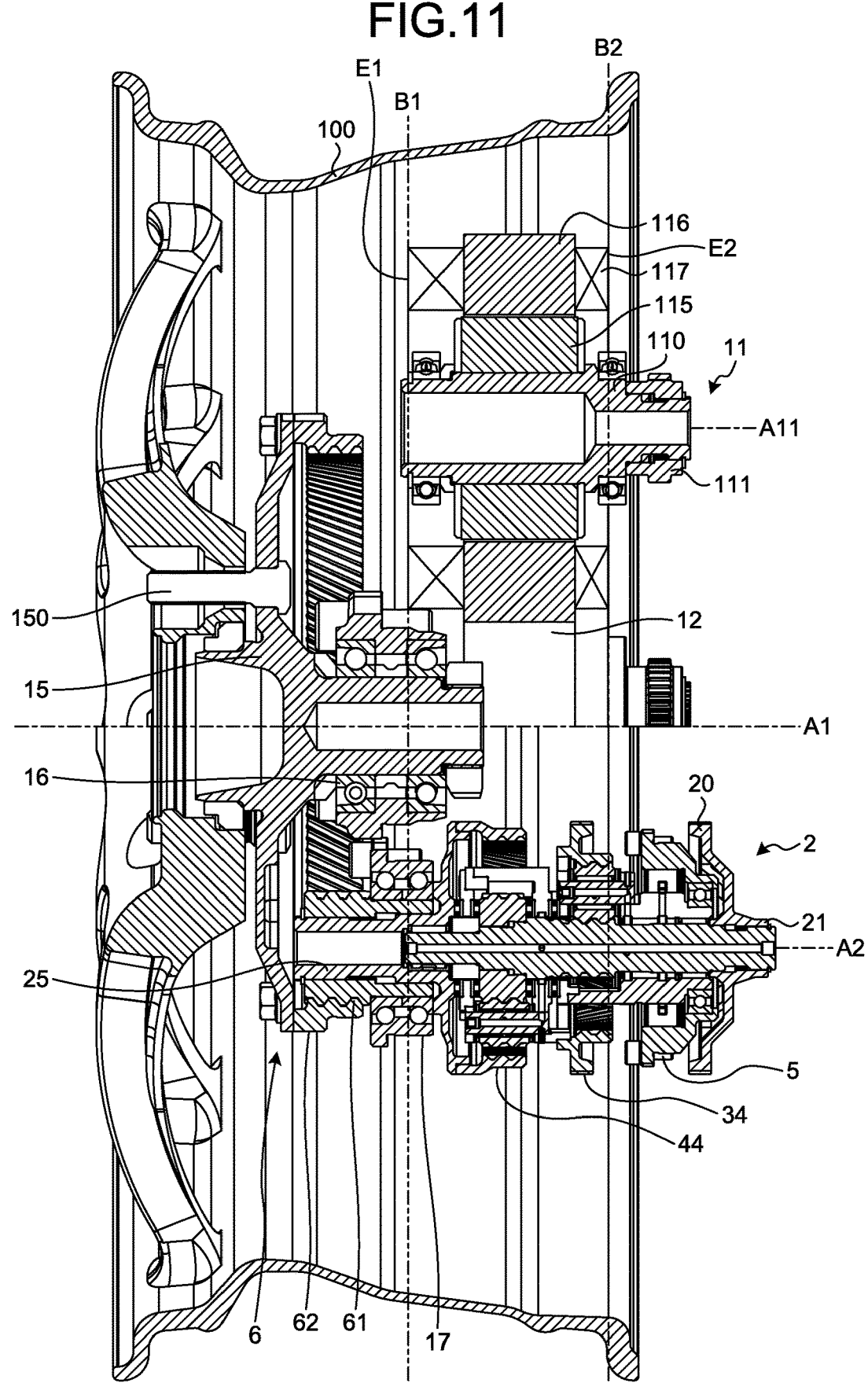
FIG. 11 is a cross-sectional view along line A-A in FIG. 9.
Figure 12:
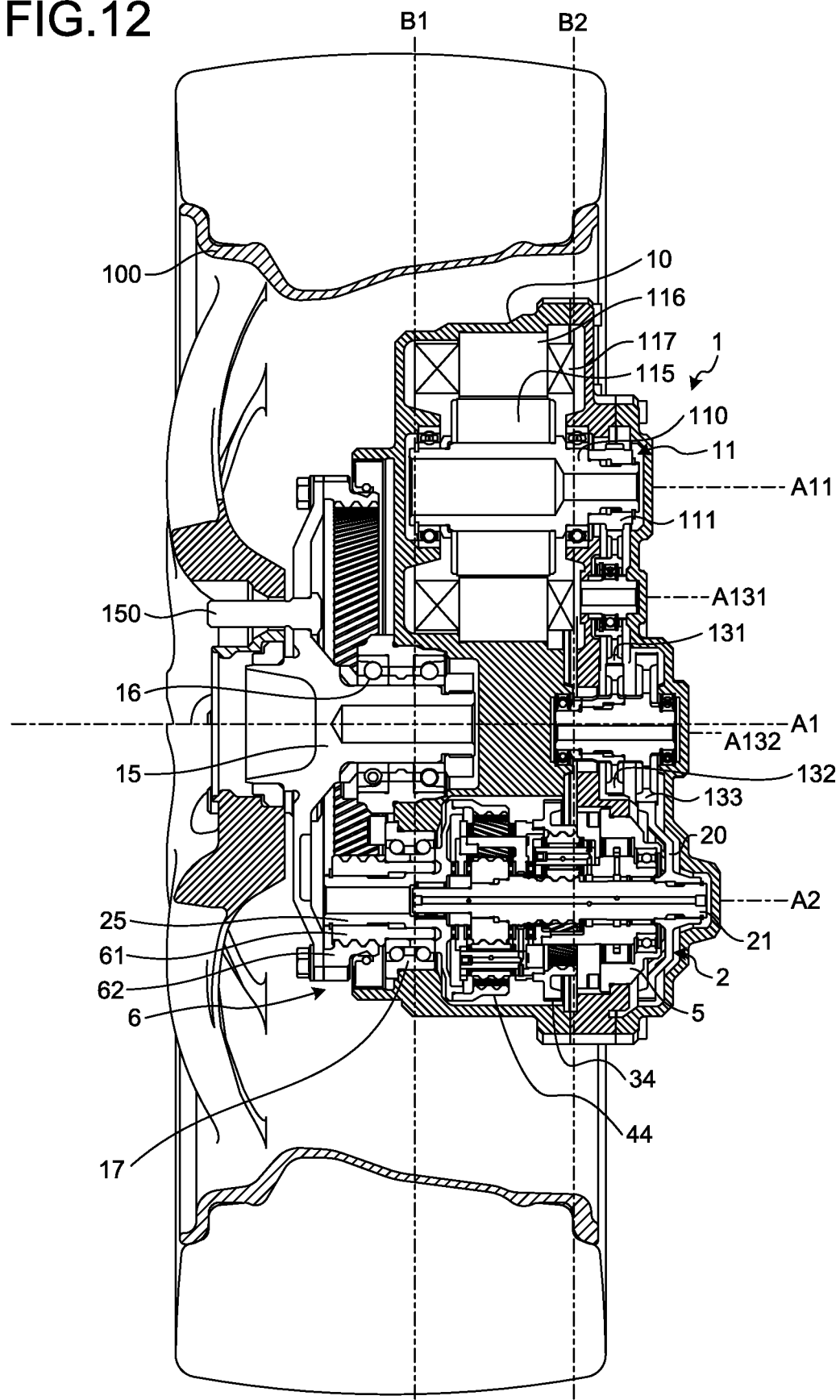
FIG. 12 is a cross-sectional view along line B-B in FIG. 10.
Figure 13:
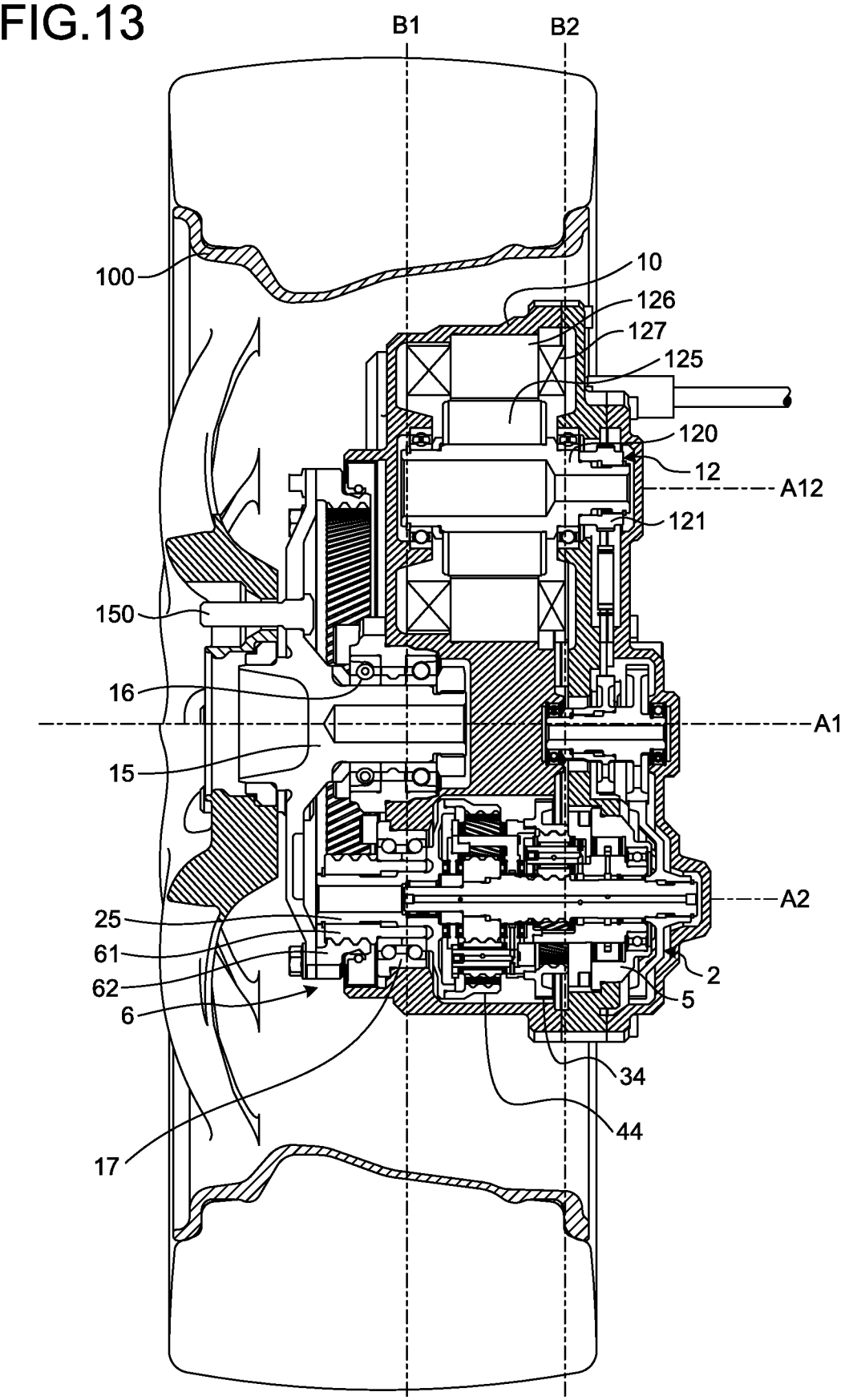
FIG. 13 is a cross-sectional view along line C-C in FIG. 10.
Figure 14:
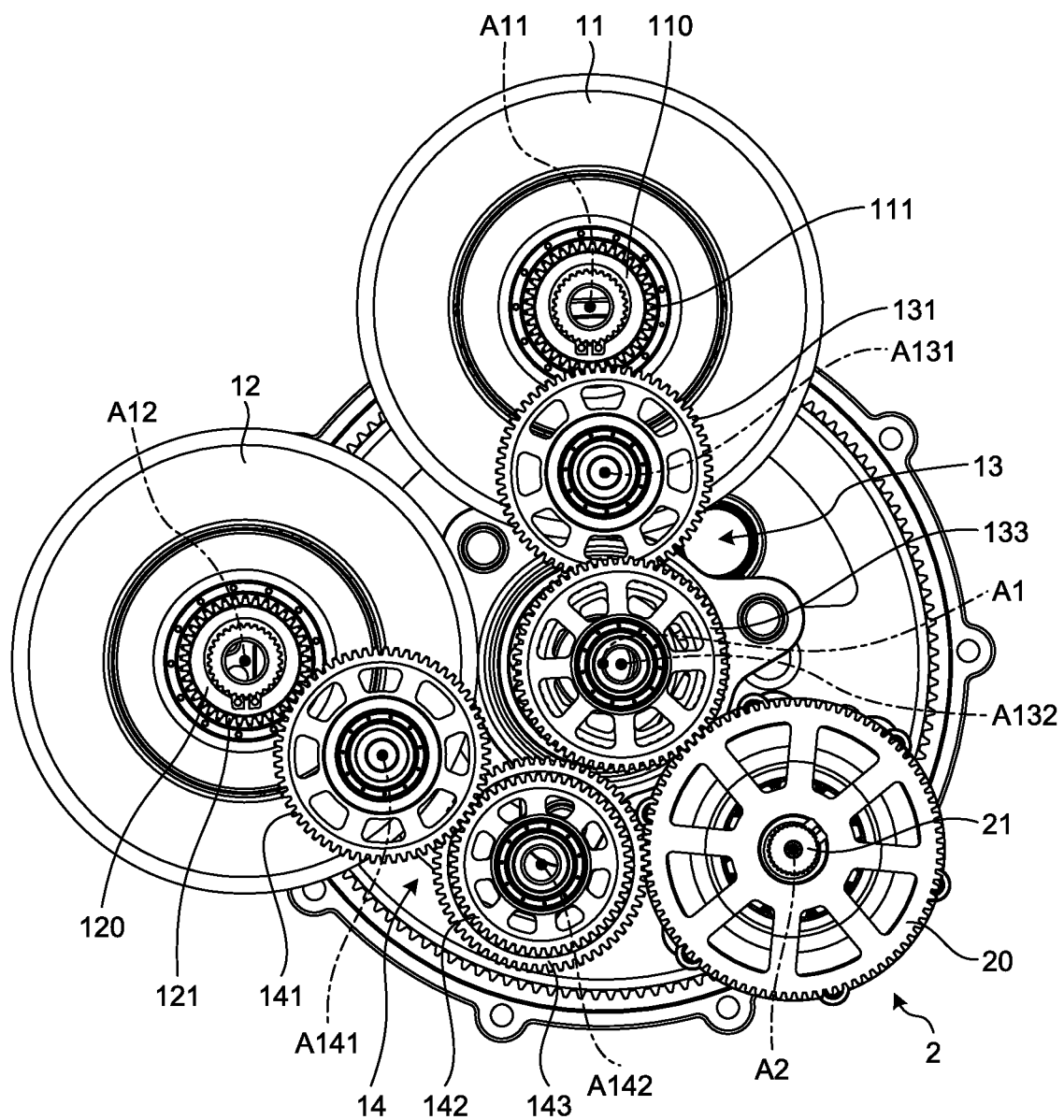
FIG. 14 is a front view of a first motor, a first reduction gear, a second motor, a second reduction gear, and a transmission device in the embodiment.
Figure 15:
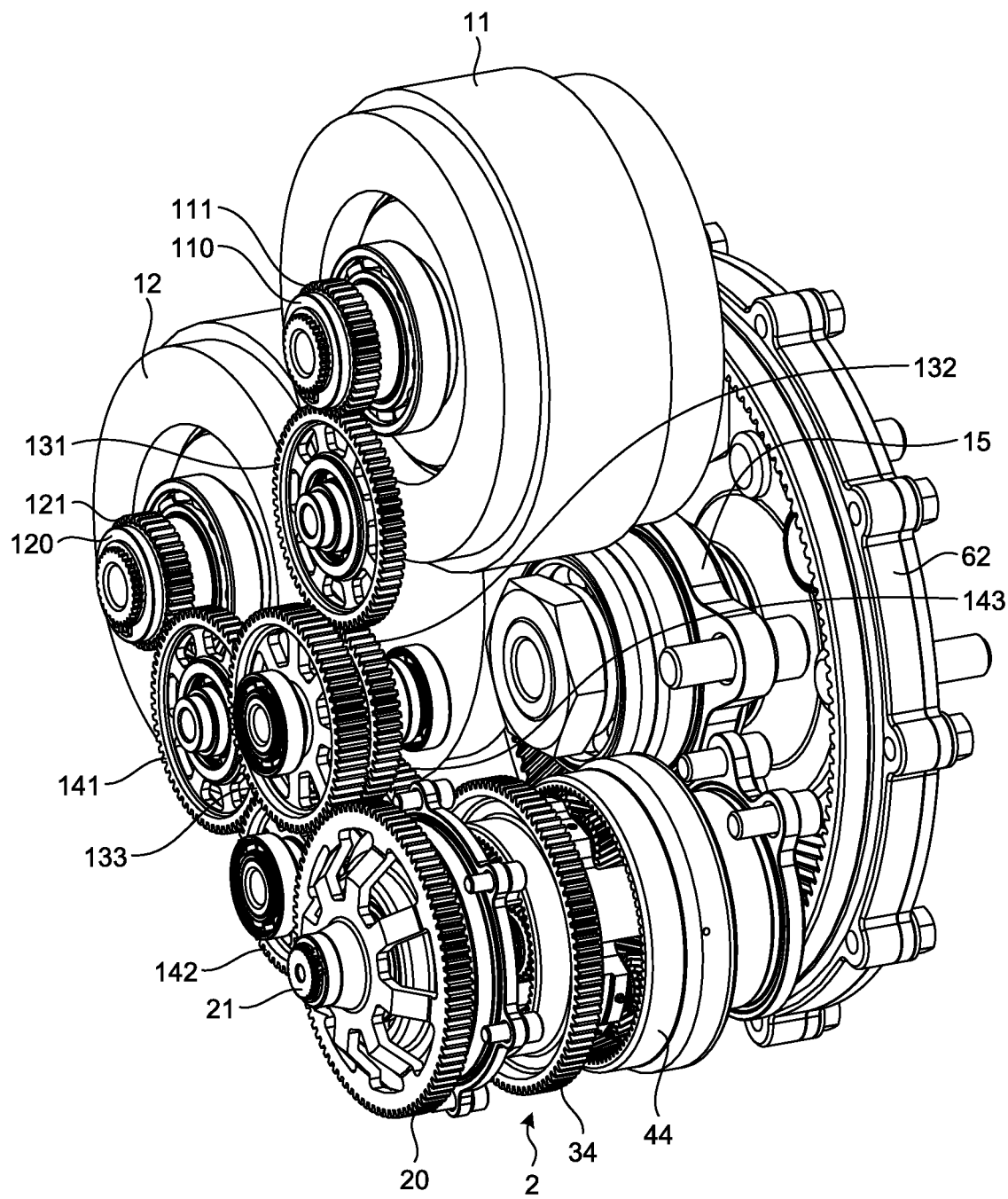
FIG. 15 is a perspective view of the first motor, the first reduction gear, the second motor, the second reduction gear, and the transmission device in the embodiment.
Figure 16:
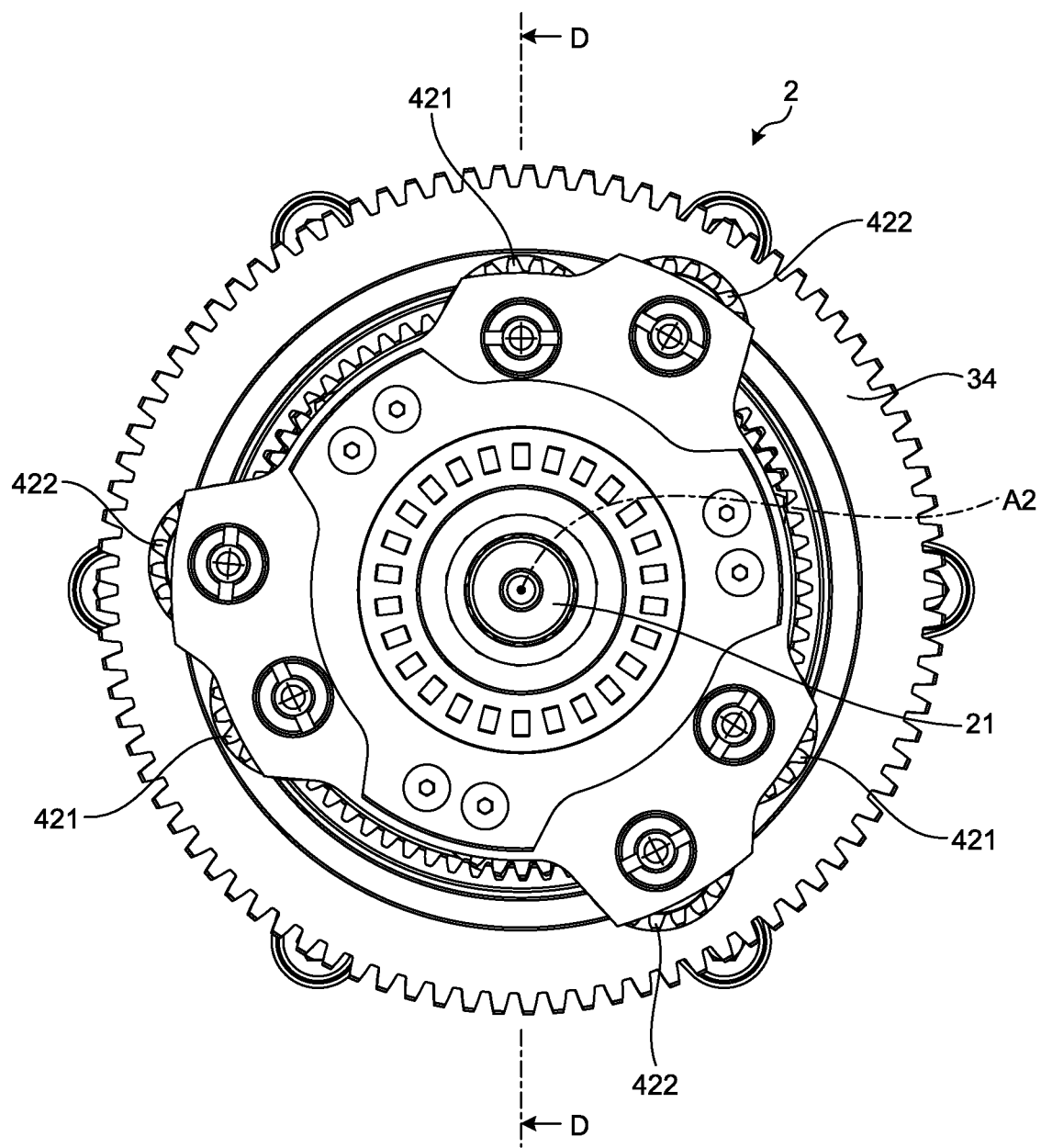
FIG. 16 is a rear view of the transmission device.
Figure 17:
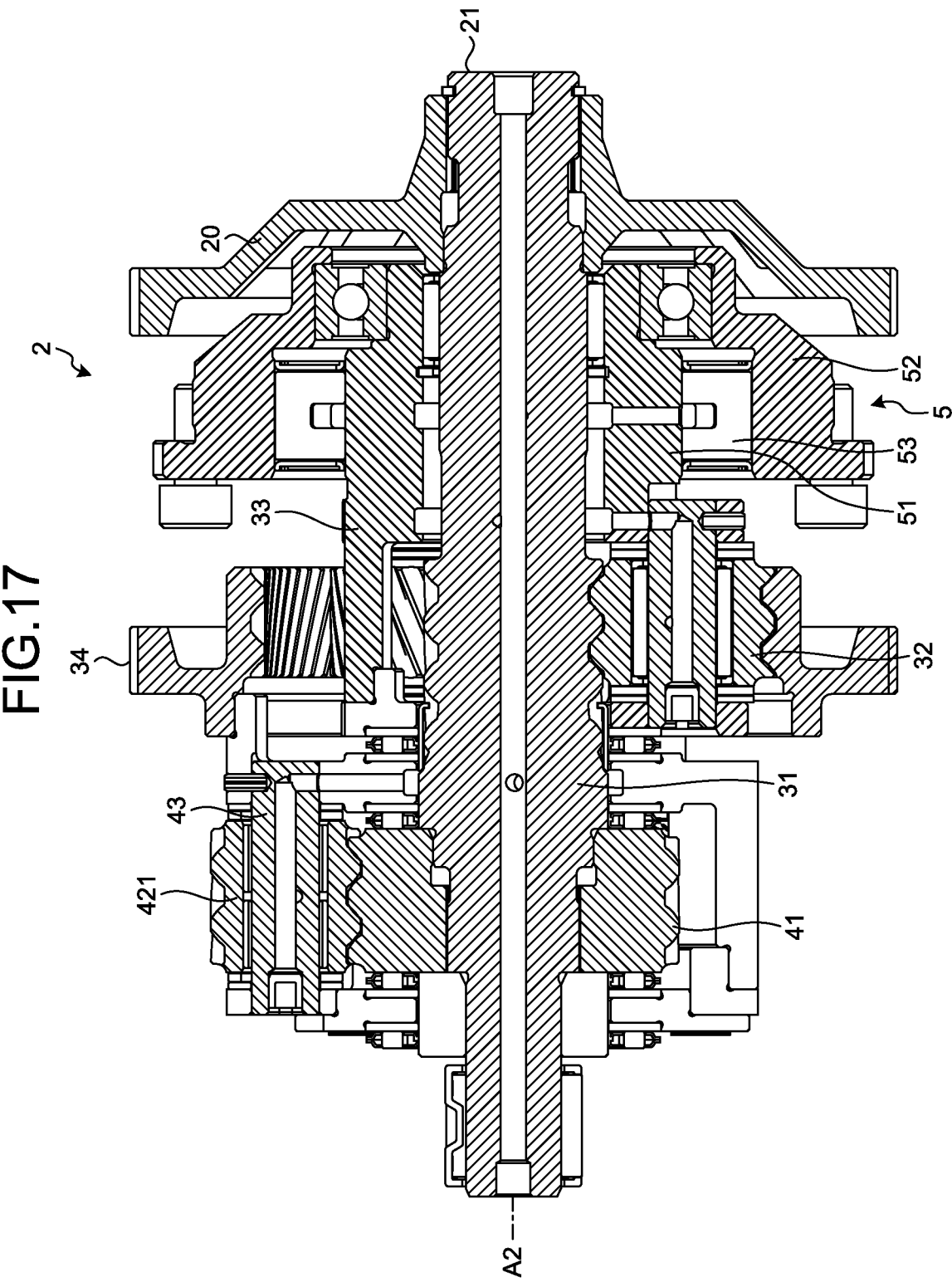
FIG. 17 is a cross-sectional view along line D-D in FIG. 16.

FIG. 4 is a perspective view of the wheel on which the electric vehicle driving device in the embodiment is mounted. FIG. 5 is a perspective view of the wheel on which the electric vehicle driving device in the embodiment is mounted. FIG. 6 is a perspective view of the electric vehicle driving device in the embodiment. FIG. 7 is a perspective view of the electric vehicle driving device in the embodiment. FIG. 8 is a front view of the electric vehicle driving device in the embodiment. FIG. 9 is a front view of the electric vehicle driving device in the embodiment. FIG. 10 is a rear view of the electric vehicle driving device in the embodiment. FIG. 11 is a cross-sectional view along line A-A in FIG. 9. FIG. 12 is a cross-sectional view along line B-B in FIG. 10. FIG. 13 is a cross-sectional view along line C-C in FIG. 10. FIG. 14 is a front view of the first motor, the first reduction gear, the second motor, the second reduction gear, and the transmission device in the embodiment. FIG. 15 is a perspective view of the first motor, the first reduction gear, the second motor, the second reduction gear, and the transmission device in the embodiment. FIG. 16 is a rear view of the transmission device. FIG. 17 is a cross-sectional view along line D-D in FIG. 16.

In FIGS. 8, 14, and 15, the case 10 is omitted. In FIG. 9, the case 10, the first reduction gear 13, and the second reduction gear 14 are omitted. In FIGS. 12 and 13, the case 10 and the wheel 100 are hatched and hatching of the other members is omitted for ease of viewing. In FIG. 16, the second ring gear 44 is omitted.

In the following description, a direction parallel to the rotation axis A1 is simply referred to as an axial direction. A direction orthogonal to the axial direction is referred to as a radial direction.

As illustrated in FIG. 4 and FIG. 5, the electric vehicle driving device 1 is arranged on the inner side of the wheel 100 of the vehicle. The electric vehicle driving device 1 is fixed to the wheel 100 with a plurality of stud bolts 150 projecting from the output member 15. As illustrated in FIG. 12, the output member 15 is supported on the case 10 with a bearing 16 interposed therebetween. The fourth pinion gear 61 of the final reduction gear 6 is supported on the case 10 with a bearing 17 interposed therebetween. The first motor 11, the first reduction gear 13, the second motor 12, the second reduction gear 14, and the transmission device 2 are arranged inside the case 10.

As illustrated in FIG. 8, in the electric vehicle driving device 1, a position of the rotation axis A12 of the second motor 12 differs from a position of the rotation axis A11 of the first motor 11. As illustrated in FIG. 8, a straight line passing through the rotation axis A2 of the transmission device 2 and the rotation axis A1 of the output member 15 when seen from the direction parallel to the rotation axis A1 is assumed to be a straight line L1. The rotation axis A11 of the first motor 11 is located on one side of the straight line L1. The rotation axis A12 of the second motor 12 is located on the other side of the straight line L1. That is to say, the rotation axis A12 of the second motor 12 is located on the opposite side to the rotation axis A11 of the first motor 11 with respect to the straight line L1. In the embodiment, a distance to the rotation axis A12 of the second motor 12 from the straight line L1 is equal to a distance to the rotation axis A11 of the first motor 11 from the straight line L1.

As illustrated in FIG. 8, the electric vehicle driving device 1 includes a connector 8. The first motor 11 and the second motor 12 are driven by a three-phase alternating current including a U phase, a V phase, and a W phase. The connector 8 is connected to an inverter (power supply device) provided in the vehicle with a cable. To be specific, the cable having a plurality of core wires is connected to the connector 8 in order to supply the three-phase alternating current to each of the first motor 11 and the second motor 12. The connector 8 has seven connection portions that are electrically connected to the core wires of the cable. Six of the seven connection portions are connected to the core wires connected to the inverter. One of the seven connection portions is connected to a ground wiring.

As illustrated in FIG. 8, when seen from the direction parallel to the rotation axis A1 of the output member 15, a half line passing through the rotation axis A11 of the first motor 11 with the rotation axis A1 serving as an end point thereof is assumed to be a first half line H1 and a half line passing through the rotation axis A12 of the second motor 12 with the rotation axis A1 serving as an end point is assumed to be a second half line H2. The connector 8 is located in a smaller region R2 of regions R1 and R2 partitioned by the first half line H1 and the second half line H2.

As illustrated in FIG. 12, the first motor 11 includes the first shaft 110, the first motor gear 111, a first rotor 115, a first stator 116, and a first coil 117. The first shaft 110 is supported on the case 10 with a bearing interposed therebetween. The first motor gear 111 is mounted on an end portion of the first shaft 110 and rotates about the rotation axis A11 together with the first shaft 110. The first rotor 115 is mounted on the first shaft 110 and rotates about the rotation axis A11 together with the first shaft 110. The first rotor 115 includes a plurality of magnets. The first stator 116 is arranged on the outer side of the first rotor 115 in the radial direction and is fixed to the case 10. The first coil 117 is wound around teeth of the first stator 116 with an insulator interposed therebetween. The three-phase alternating current is supplied to the first coil 117.

As illustrated in FIG. 13, the second motor 12 includes the second shaft 120, the second motor gear 121, a second rotor 125, a second stator 126, and a second coil 127. The second shaft 120 is supported on the case 10 with a bearing interposed therebetween. The second motor gear 121 is mounted on an end portion of the second shaft 120 and rotates about the rotation axis A12 together with the second shaft 120. The second rotor 125 is mounted on the second shaft 120 and rotates about the rotation axis A12 together with the second shaft 120. The second rotor 125 includes a plurality of magnets. The second stator 126 is arranged on the outer side of the second rotor 125 in the radial direction and is fixed to the case 10. The second coil 127 is wound around teeth of the second stator 126 with an insulator interposed therebetween. The three-phase alternating current is supplied to the second coil 127.

In the embodiment, the outer diameter of the second motor 12, the length thereof in the axial direction, and the wound wire structure (winding manner of the second coil 127) thereof are the same as the outer diameter of the first motor 11, the length thereof in the axial direction, and the wound wire structure (winding manner of the first coil 117) thereof. A position of an end portion of the second motor 12 in the axial direction is the same as a position of an end portion of the first motor 11 in the axial direction.

As illustrated in FIG. 11 and FIG. 12, a plane passing through a first end portion E1 as a portion located on the endmost side in the axial direction among an end portion of the first rotor 115 in the axial direction, an end portion of the first stator 116 in the axial direction, and an end portion of the first coil 117 in the axial direction and being orthogonal to the rotation axis A1 is assumed to be a first plane B1. A plane passing through a second end portion E2 as a portion located on the endmost side on the opposite side to the first end portion E1 in the axial direction among an end portion of the first rotor 115 in the axial direction, an end portion of the first stator 116 in the axial direction, and an end portion of the first coil 117 in the axial direction and being orthogonal to the rotation axis A1 is assumed to be a second plane B2. In the embodiment, the first end portion E1 is one end (end portion on the wheel 100 side) of the first coil 117 in the axial direction. The second end portion E2 is the other end (end portion on the vehicle body side) of the first coil 117 in the axial direction. As illustrated in FIG. 11 and FIG. 13, the second rotor 125, the second stator 126, and the second coil 127 are located between the first plane B1 and the second plane B2. In the embodiment, the first plane B1 passes through one end (end portion on the wheel 100 side) of the second coil 127 in the axial direction. The second plane B2 passes through the other end (end portion on the vehicle body side) of the second coil 127 in the axial direction.

As illustrated in FIG. 14, the first reduction gear 13 is located between the first motor gear 111 and the transmission device 2. A rotation axis A131 of the first gear 131 is located between the rotation axis A11 and the rotation axis A2. A rotation axis A132 of the second gear 132 and the third gear 133 is located between the rotation axis A131 and the rotation axis A2.

As illustrated in FIG. 14, the second reduction gear 14 is located between the second motor gear 121 and the transmission device 2. A rotation axis A141 of the first gear 141 is located between the rotation axis A12 and the rotation axis A2. A rotation axis A142 of the second gear 142 and the third gear 143 is located between the rotation axis A141 and the rotation axis A2.

As illustrated in FIG. 11, at least a part of the transmission device 2 is located between the first plane B1 and the second plane B2. In the embodiment, the length of the transmission device 2 in the axial direction is larger than a distance between the first plane B1 and the second plane B2.

The clutch 5 is, for example, a what-is-called cam clutch device. As illustrated in FIG. 17, the clutch 5 includes an inner race 51, an outer race 52, and a roller 53. In the embodiment, the inner race 51 is formed integrally with the first carrier 33. The outer race 52 is fixed to the case 10 with a bolt. The roller 53 is arranged between the inner race 51 and the outer race 52. The roller 53 is supported on the inner race 51 and rotates together with the inner race 51. When the inner race 51 rotates in the first direction, the roller 53 is engaged with the outer race 52. The inner race 51 cannot rotate, so that the first carrier 33 also cannot rotate. The engaged state of the clutch 5 is thereby established. On the other hand, when the inner race 51 rotates in the second direction as the opposite direction to the first direction, the roller 53 is not engaged with the outer race 52. The inner race 51 can rotate, so that the first carrier 33 can also rotate. The separated state of the clutch 5 is thereby established.

When two motors are arranged so as to overlap with each other in the axial direction as in Patent Literature 1 as described above, the driving device tends to be increased in size in the axial direction. When the driving device in Patent Literature 1 is mounted on a wheel of a vehicle, a portion of the driving device that projects to the vehicle body side from the wheel is increased in length. As a result, types of suspensions that can be coupled to the driving device are possibly limited. To be specific, when the driving device is arranged on a front wheel of the vehicle, the driving device can be mounted on a double wishbone-type suspension but it is difficult to mount the driving device on a strut-type suspension.

By contrast, in the electric vehicle driving device 1 in the embodiment, the first motor 11 and the second motor 12 do not overlap with each other in the axial direction. The electric vehicle driving device 1 can therefore be reduced in length in the axial direction. As a result, a portion of the electric vehicle driving device 1 that projects to the vehicle body side from the wheel 100 is reduced in length. Accordingly, types of suspensions that can be applied to the electric vehicle driving device 1 are increased. To be specific, the electric vehicle driving device 1 can be mounted on the strut-type suspension. It should be noted that the suspension is mounted on the end surface or the like of the electric vehicle driving device 1 on the vehicle body side.

It is not necessary that all of the second rotor 125, the second stator 126, and the second coil 127 illustrated in FIG. 13 are located between the first plane B1 and the second plane B2. For example, a part of the second rotor 125, a part of the second stator 126, or a part of the second coil 127 may be located on an outer side of the region interposed between the first plane B1 and the second plane B2. That is to say, it is sufficient that at least a part of the second rotor 125, at least a part of the second stator 126, and at least a part of the second coil 127 are located between the first plane B1 and the second plane B2.

The distance to the rotation axis A12 of the second motor 12 from the straight line L1 illustrated in FIG. 8 may not be necessarily equal to the distance to the rotation axis A11 of the first motor 11 from the straight line L1. The distance to the rotation axis A12 of the second motor 12 from the straight line L1 may be larger or smaller than the distance to the rotation axis A11 of the first motor 11 from the straight line L1. It is sufficient that the first motor 11 is located on one side of the straight line L1 and the second motor 12 is located on the other side of the straight line L2.

Both of the first motor 11 and the second motor 12 may not be necessarily driven in the low gear mode. Only the first motor 11 of the first motor 11 and the second motor 12 may be driven. The numbers of teeth of the above-mentioned gears are merely examples and are not particularly limited.

As described above, the electric vehicle driving device 1 includes the first motor 11, the second motor 12, and the transmission device 2. The first motor 11 includes the first rotor 115, the first stator 116, and the first coil 117. The second motor 12 includes the second rotor 125, the second stator 126, and the second coil 127. The power in at least one of the first motor 11 and the second motor 12 is transmitted to the transmission device 2. The plane passing through the first end portion E1 as the portion located on the endmost side in the axial direction parallel to the rotation axis A11 of the first motor 11 among the end portion of the first rotor 115 in the axial direction, the end portion of the first stator 116 in the axial direction, and the end portion of the first coil 117 in the axial direction and being orthogonal to the rotation axis A11 is the first plane B1. The plane passing through the second end portion E2 as the portion located on the endmost side on the opposite side to the first end portion E1 in the axial direction among the end portion of the first rotor 115 in the axial direction, the end portion of the first stator 116 in the axial direction, and the end portion of the first coil 117 in the axial direction and being orthogonal to the rotation axis A11 is the second plane B2. At least a part of the second rotor 125, at least a part of the second stator 126, and at least a part of the second coil 127 are located between the first plane B1 and the second plane B2.

With this configuration, the second motor 12 does not overlap with the first motor 11 in the axial direction. The electric vehicle driving device 1 can therefore be reduced in size in the axial direction. The electric vehicle driving device 1 can shift gear because the first motor 11 and the second motor 12 are provided together with the transmission device 2. Accordingly, the electric vehicle driving device 1 can shift gear and be reduced in length in the axial direction.

In the electric vehicle driving device 1, at least a part of the transmission device 2 is located between the first plane B1 and the second plane B2.

With this configuration, the transmission device 2 does not overlap with the first motor 11 and the second motor 12 in the axial direction. The electric vehicle driving device 1 can therefore be easily further reduced in length in the axial direction.

The electric vehicle driving device 1 can also be described as follows. That is to say, the electric vehicle driving device 1 includes the first motor 11, the second motor 12, the transmission device 2, and the output member 15. The power in at least one of the first motor 11 and the second motor 12 is transmitted to the transmission device 2. The output member 15 rotates with the power output from the transmission device 2. The rotation axis A11 of the first motor 11, the rotation axis A12 of the second motor 12, and the rotation axis A2 of the transmission device 2 are arranged in parallel to the rotation axis A1 of the output member 15. When seen from the axial direction parallel to the rotation axis A1 of the output member 15, the rotation axis A11 of the first motor 11 is located on one side of the straight line L1 passing through the rotation axis A1 of the output member 15 and the rotation axis A2 of the transmission device 2, and the rotation axis A12 of the second motor 12 is located on the other side of the straight line L1.

With this configuration, the position of the rotation axis A11 of the first motor 11 and the position of the rotation axis A12 of the second motor 12 differ from each other. The second motor 12 can therefore be arranged so as not to overlap with the first motor 11 in the axial direction. The position of the rotation axis A2 of the transmission device 2 differs from the position of the rotation axis A11 of the first motor 11 and the position of the rotation axis A12 of the second motor 12. The transmission device 2 can therefore be arranged so as not to overlap with the first motor 11 and the second motor 12 in the axial direction. Accordingly, the electric vehicle driving device 1 can shift gear and be reduced in length in the axial direction.

Difference between the distance to the transmission device 2 from the first motor 11 and the distance to the transmission device 2 from the second motor 12 is decreased. When reduction gears are arranged between the first motor 11 and the transmission device 2 and between the second motor 12 and the transmission device 2, the sizes of the two reduction gears can be made close.

The electric vehicle driving device 1 includes the connector 8 for mounting the wiring for supplying electric power to the first motor 11 and the second motor 12. When seen from the axial direction, the connector 8 is located in the smaller region R2 of the two regions (regions R1 and R2) partitioned by the first half line H1 passing through the rotation axis A11 of the first motor 11 with the rotation axis A1 of the output member 15 being the end point and the second half line H2 passing through the rotation axis A12 of the second motor 12 with the rotation axis A1 of the output member 15 being the end point.

The transmission device 2 is arranged in the larger region R1 of the two regions (regions R1 and R2) partitioned by the first half line H1 and the second half line H2. Since a large number of gears configuring the two reduction gears (the first reduction gear 13 and the second reduction gear 14) are therefore arranged in the larger region R1 in a rotatable manner, it is difficult to arrange the wiring toward the first motor 11 and the second motor 12 from the connector 8 in the larger region R1 because a space in which the wiring can be provided is small therein. In consideration of this, when the connector 8 is located in the smaller region R2, the wiring is easily arranged because obstacles to the wiring such as a large number of gears are reduced. Furthermore, difference between the distance to the first motor 11 from the connector 8 and the distance to the second motor 12 from the connector 8 can be reduced.

The electric vehicle driving device 1 includes the first reduction gear 13 that amplifies the torque generated in the first motor 11 and transmits it to the transmission device 2 and the second reduction gear 14 that amplifies the torque generated in the second motor 12 and transmits it to the transmission device 2.

In the electric vehicle driving device 1, the outer diameters of the first motor 11 and the second motor 12 are reduced whereas the second motor 12 does not overlap with the first motor 11 in the axial direction. Increase in the torques that the first motor 11 and the second motor 12 output therefore has a limit. To cope with the limit, the torque that is transmitted to the transmission device 2 can be increased by providing the first reduction gear 13 and the second reduction gear 14 in the electric vehicle driving device 1. Accordingly, the electric vehicle driving device 1 can be reduced in length in the axial direction and increase the torque capable of being output.

Modifications

Figure 18:
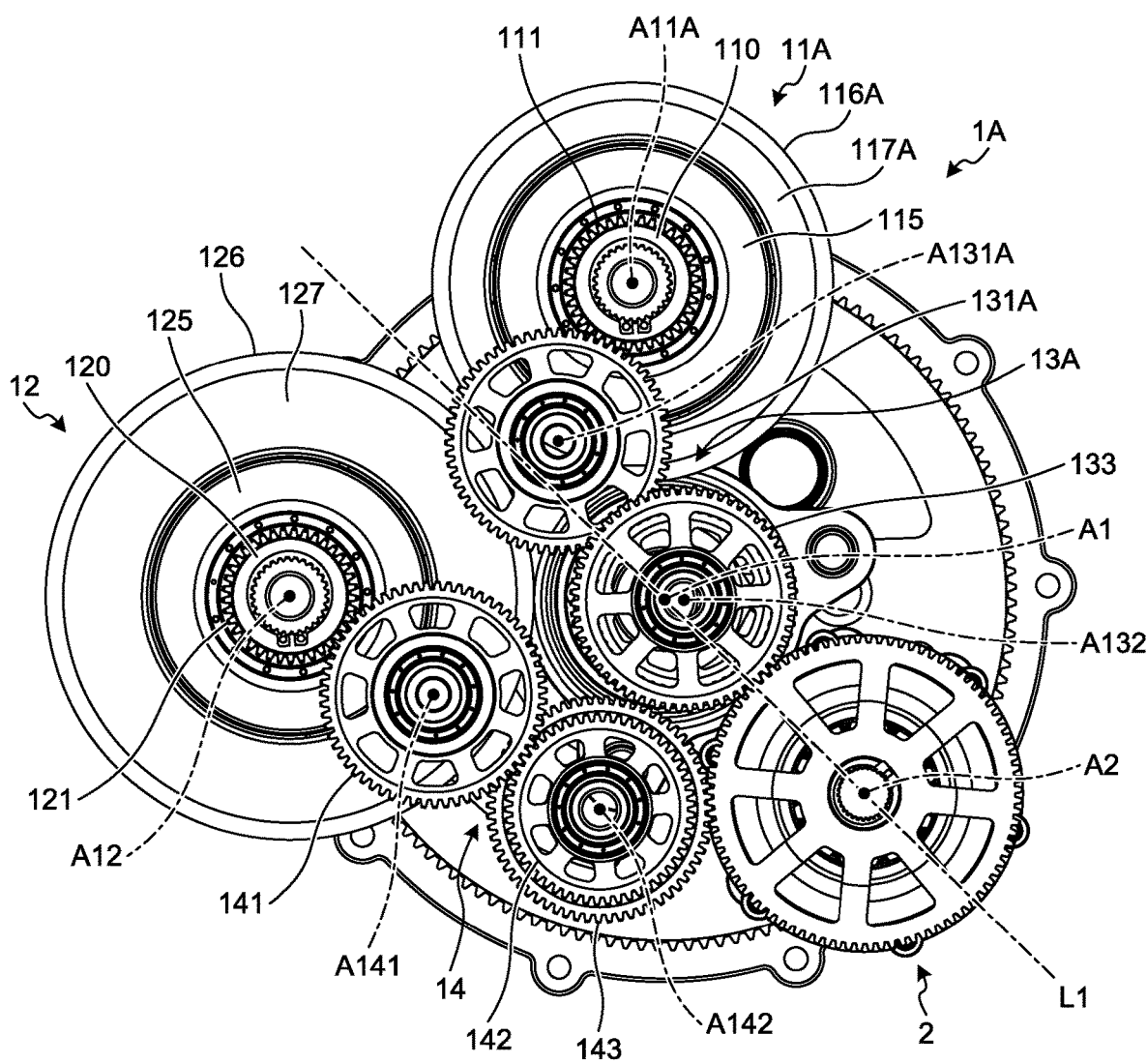
FIG. 18 is a front view of an electric vehicle driving device according to a modification.
Figure 19:
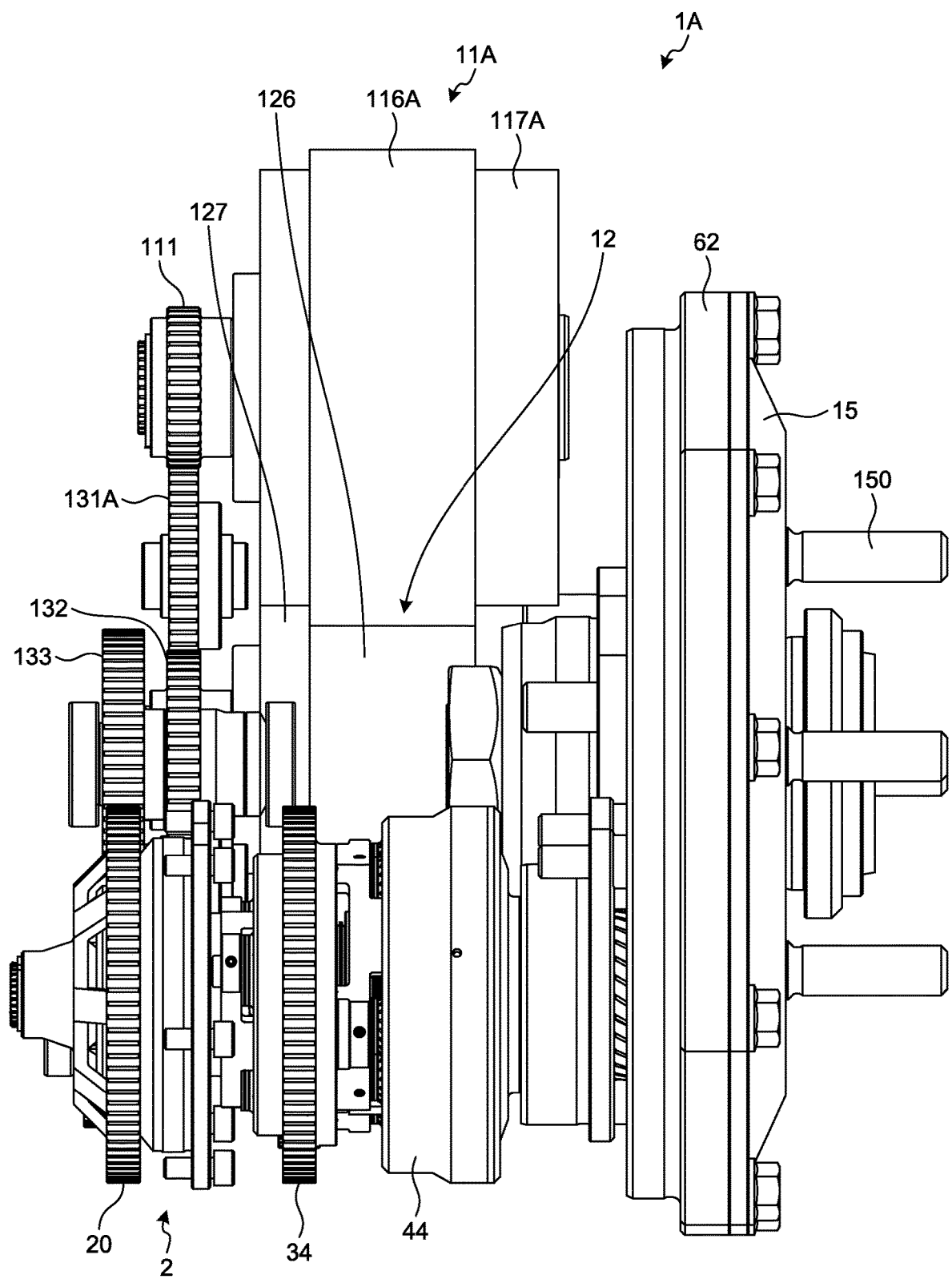
FIG. 19 is a right side view of the electric vehicle driving device in the modification.
Figure 20:
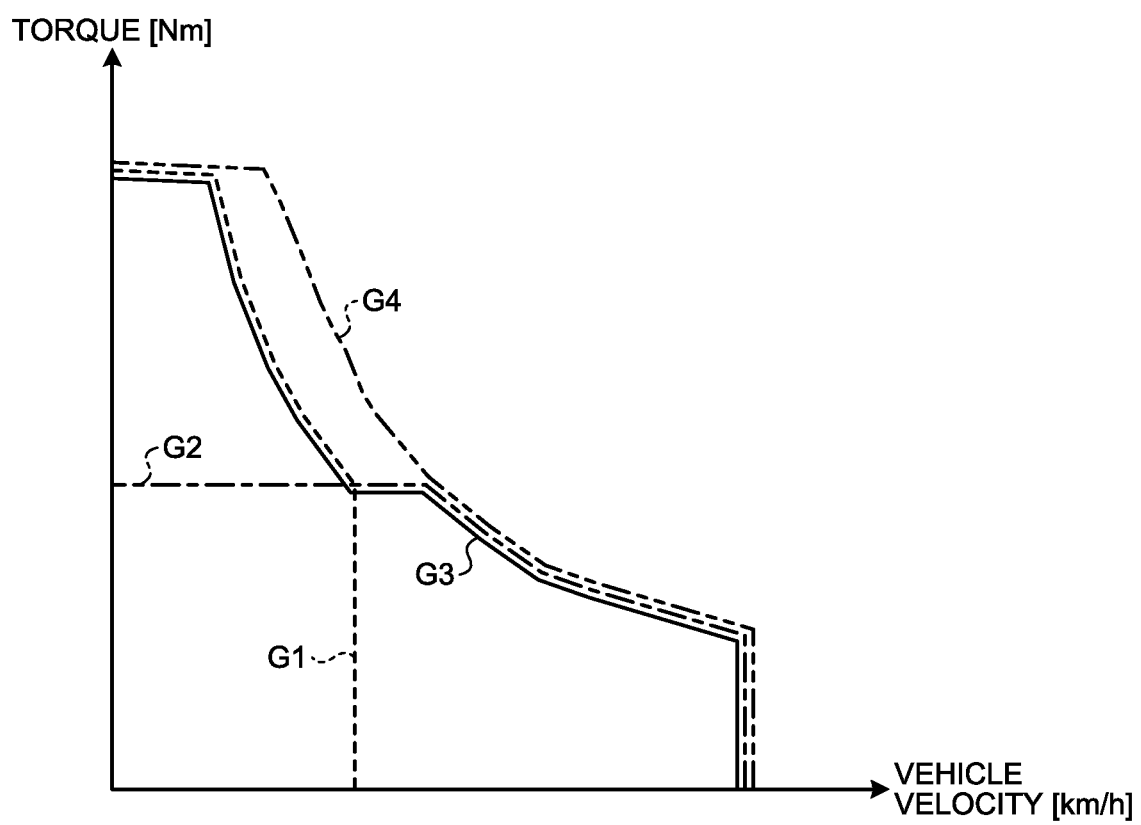
FIG. 20 is a graph illustrating a relation between torque that is transmitted to the wheel and a vehicle speed.

FIG. 18 is a front view of an electric vehicle driving device according to a modification. FIG. 19 is a right side view of the electric vehicle driving device in the modification. FIG. 20 is a graph illustrating a relation between torque that is transmitted to the wheel and a vehicle speed. The same reference numerals denote the same components as those described in the above-mentioned embodiment and overlapping description thereof is omitted.

An electric vehicle driving device 1A in the modification includes a first motor 11A differing from the above-mentioned first motor 11. As illustrated in FIG. 18, the first motor 11A includes a first stator 116A and a first coil 117A. The outer diameter of the first stator 116A is smaller than the outer diameter of the second stator 126. As illustrated in FIG. 19, the length of the first stator 116A in the axial direction is the same as the length of the second stator 126 in the axial direction. The wound wire structure (winding manner of the first coil 117A) of the first motor 11A is the same as the wound wire structure (winding manner of the second coil 127) of the second motor 12. With this configuration, when the angular velocity of the second motor 12 is the same as the angular velocity of the first motor 11A, torque that is generated in the second motor 12 is larger than torque that is generated in the first motor 11A.

As illustrated in FIG. 18, a rotation axis A11A of the first motor 11A is located on one side of the straight line L1. The rotation axis A12 of the second motor 12 is located on the other side of the straight line L1. That is to say, the rotation axis A12 of the second motor 12 is located on the opposite side to the rotation axis A11A of the first motor 11A with respect to the straight line L1. In the modification, a distance to the rotation axis A12 of the second motor 12 from the straight line L1 is larger than a distance to the rotation axis A11A of the first motor 11A from the straight line L1.

Also in the modification, the first motor 11A, the second motor 12, and the transmission device 2 can be arranged so as not to overlap with one another in the axial direction as in the above-mentioned embodiment. The electric vehicle driving device 1A can therefore be easily reduced in size in the axial direction.

As illustrated in FIG. 18, a first reduction gear 13A in the modification includes a first gear 131A. The first motor gear 111 of the first motor 11A is engaged with the first gear 131A. A position of a rotation axis A131A of the first gear 131A differs from a position of the rotation axis A131 of the first gear 131 in the above-mentioned embodiment. As illustrated in FIG. 19, the first gear 131A is engaged with the second gear 132.

The angular velocity of the first motor 11 and the angular velocity of the second motor 12 differ from each other in the low gear mode in the above-mentioned embodiment. The power that is generated in the first motor 11 and the power that is generated in the second motor 12 therefore differ from each other. On the other hand, the power that is generated in the first motor 11 and the power that is generated in the second motor 12 are substantially the same (in a strict sense, the power of the second motor 12 is about 1.06 times as large as the power of the first motor 11 when the numbers of teeth of gears are supposed to be those of the above-mentioned transmission device 2) in the high gear mode in the above-mentioned embodiment.

A dashed curve G1 in FIG. 20 is a traveling performance curve in the low gear mode in the above-mentioned embodiment. An alternate long and short dashed curve G2 in FIG. 20 is a traveling performance curve in the high gear mode in the above-mentioned embodiment. A solid curve G3 in FIG. 20 is a traveling performance curve of the electric vehicle driving device 1 in the above-mentioned embodiment. An alternate long and two short dashed curve G4 in FIG. 20 is an ideal traveling performance curve. The traveling performance curve is desirably a smooth curve like the alternate long and two short dashed curve G4. In FIG. 20, although the dashed curve G1 and the alternate long and short dashed curve G2 overlap with a part of the solid curve G3 and a part of the alternate long and two short dashed curve G4, the dashed curve G1 and the short dashed curve G2 are drawn while deviating from them for the ease of viewing.

Bending points are generated on center portions of the solid line G3 as illustrated in FIG. 21 because the power that is generated in the first motor 11 and the power that is generated in the second motor 12 differ from each other in the low gear mode whereas the power that is generated in the first motor 11 and the power that is generated in the second motor 12 are substantially the same in the high gear mode. That is to say, the traveling performance curve hardly becomes a smooth curve.

By contrast, in the modification, the outer diameter of the first motor 11A is smaller than the outer diameter of the second motor 12. With these diameters, even when the angular velocity of the first motor 11A is larger than the angular velocity of the second motor 12, the difference between the power that is generated in the first motor 11A and the power that is generated in the second motor 12 is decreased. Accordingly, with the electric vehicle driving device 1A in the modification, a smooth traveling performance curve is easily provided.

REFERENCE SIGNS LIST 1, 1A ELECTRIC VEHICLE DRIVING DEVICE
10 CASE
100 WHEEL
11, 11A FIRST MOTOR
110 FIRST SHAFT
111 FIRST MOTOR GEAR
115 FIRST ROTOR
116, 116A FIRST STATOR
117, 117A FIRST COIL
12 SECOND MOTOR

120 SECOND SHAFT
121 SECOND MOTOR GEAR
125 SECOND ROTOR
126 SECOND STATOR
127 SECOND COIL
13, 13A FIRST REDUCTION GEAR
131, 131A FIRST GEAR
132 SECOND GEAR
133 THIRD GEAR
14 SECOND REDUCTION GEAR
141 FIRST GEAR
142 SECOND GEAR
143 THIRD GEAR
15 OUTPUT MEMBER
150 STUD BOLT
16, 17 BEARING
2 TRANSMISSION DEVICE
20 INPUT GEAR
21 SUN GEAR SHAFT
25 TRANSMISSION DEVICE OUTPUT SHAFT
3 FIRST PLANETARY GEAR DEVICE
31 FIRST SUN GEAR
32 FIRST PINION GEAR
33 FIRST CARRIER
34 FIRST RING GEAR
4 SECOND PLANETARY GEAR DEVICE
41 SECOND SUN GEAR
421 SECOND PINION GEAR
422 THIRD PINION GEAR
43 SECOND CARRIER
44 SECOND RING GEAR
5 CLUTCH
51 INNER RACE
52 OUTER RACE
53 ROLLER
6 FINAL REDUCTION GEAR
61 FOURTH PINION GEAR
62 THIRD RING GEAR
8 CONNECTOR
9 CONTROL DEVICE
A1, A11, A12, A2, A131, A131A, A132, A141, A142 ROTATION AXIS
B1 FIRST PLANE
B2 SECOND PLANE
E1 FIRST END PORTION
E2 SECOND END PORTION
H1 FIRST HALF LINE
H2 SECOND HALF LINE
L1 STRAIGHT LINE
R1, R2 REGION

The invention claimed is:

1. An electric vehicle driving device comprising:
a first motor;
a second motor;
a transmission device to which power of at least one of the first motor and the second motor is transmitted, the transmission device being able to change a reduction ratio; and
an output member that rotates with power output from the transmission device, wherein
a rotation axis of the first motor, a rotation axis of the second motor, and a rotation axis of the transmission device are arranged in parallel to a rotation axis of the output member, and
when seen from an axial direction parallel to the rotation axis of the output member, a position of the rotation axis of the first motor, a position of the rotation axis of the second motor, a position of the rotation axis of the transmission device, and a position of the rotation axis of the output member differ from each other, and the rotation axis of the first motor is located on one side of a straight line passing through the rotation axis of the output member and the rotation axis of the transmission device and the rotation axis of the second motor is located on the other side of the straight line.

2. The electric vehicle driving device according to claim 1, comprising a connector for mounting wiring for supplying electric power to the first motor and the second motor, wherein
when seen from the axial direction, the connector is located in a smaller region of two regions partitioned by a first half line passing through the rotation axis of the first motor with the rotation axis of the output member serving as an end point and a second half line passing through the rotation axis of the second motor with the rotation axis of the output member serving as an end point.

3. The electric vehicle driving device according to claim 1, comprising:
a first reduction gear that amplifies torque generated in the first motor and transmits the torque to the transmission device; and
a second reduction gear that amplifies torque generated in the second motor and transmits the torque to the transmission device.

4. The electric vehicle driving device according to claim 1, wherein a distance to the rotation axis of the first motor from the straight line and a distance to the rotation axis of the second motor from the straight line are equal to each other.

5. The electric vehicle driving device according to claim 3, wherein
the first motor includes a first motor gear, and
the first reduction gear is located between the first motor gear and the transmission device.

6. The electric vehicle driving device according to claim 3, wherein
the second motor includes a second motor gear, and
the second reduction gear is located between the second motor gear and the transmission device.

7. The electric vehicle driving device according to claim 5, wherein
the first reduction gear includes:
a first gear of the first reduction gear that is engaged with the first motor gear;
a second gear of the first reduction gear that is engaged with the first gear of the first reduction gear; and
a third gear of the first reduction gear that is a gear coaxial with the second gear of the first reduction gear and rotates together with the second gear of the first reduction gear, and
a rotation axis of the first gear of the first reduction gear is located between the rotation axis of the first motor and the rotation axis of the transmission device and
a rotation axis of the second gear of the first reduction gear and the third gear of the first reduction gear is located between the rotation axis of the first gear of the first reduction gear and the rotation axis of the transmission device.

8. The electric vehicle driving device according to claim 6, wherein
the second reduction gear includes:
a first gear of the second reduction gear that is engaged with the second motor gear;

a second gear of the second reduction gear that is engaged with the first gear of the second reduction gear; and
a third gear of the second reduction gear that is a gear coaxial with the second gear of the second reduction gear and rotates together with the second gear of the second reduction gear, and
a rotation axis of the first gear of the second reduction gear is located between the rotation axis of the second motor and the rotation axis of the transmission device and a rotation axis of the second gear of the second reduction gear and the third gear of the second reduction gear is located between the rotation axis of the first gear of the second reduction gear and the rotation axis of the transmission device.

9. The electric vehicle driving device according to claim 1, wherein
when the first motor includes a first rotor, a first stator, and a first coil, and a plane passing through a first end portion as a portion located on an endmost side in an axial direction parallel to the rotation axis of the first motor among an end portion of the first rotor in the axial direction, an end portion of the first stator in the axial direction, and an end portion of the first coil in the axial direction and being orthogonal to the rotation axis is assumed to be a first plane, and
the second motor includes a second rotor, a second stator, and a second coil, and a plane passing through a second end portion as a portion located on an endmost side on an opposite side to the first end portion in the axial direction among an end portion of the first rotor in the axial direction, an end portion of the first stator in the axial direction, and an end portion of the first coil in the axial direction and being orthogonal to the rotation axis is assumed to be a second plane,
a length of the transmission device in the axial direction is larger than a distance between the first plane and the second plane.

10. The electric vehicle driving device according to claim 1, wherein
the transmission device includes:

an input gear that receives power of the first motor;
a sun gear shaft that rotates together with the input gear;
a first sun gear that rotates together with the sun gear shaft;
a first pinion gear that is engaged with the first sun gear;
a first carrier that supports the first pinion gear so as to enable the first pinion gear to rotate and enable the first pinion gear to revolve about the first sun gear;
a clutch that restricts rotation of the first carrier; and
a first ring gear that receives power of the second motor as an external gear and is engaged with the first pinion gear as an internal gear, and
the clutch is a one-way clutch.

11. The electric vehicle driving device according to claim 1, wherein
when the first motor includes a first rotor, a first stator, and a first coil, and a plane passing through a first end portion as a portion located on an endmost side in an axial direction parallel to the rotation axis of the first motor among an end portion of the first rotor in the axial direction, an end portion of the first stator in the axial direction, and an end portion of the first coil in the axial direction and being orthogonal to the rotation axis is assumed to be a first plane, and
the second motor includes a second rotor, a second stator, and a second coil, and a plane passing through a second end portion as a portion located on an endmost side on an opposite side to the first end portion in the axial direction among an end portion of the first rotor in the axial direction, an end portion of the first stator in the axial direction, and an end portion of the first coil in the axial direction and being orthogonal to the rotation axis is assumed to be a second plane,
at least a part of the transmission device is located between the first plane and the second plane.

12. The electric vehicle driving device according to claim 1, wherein a distance to the rotation axis of the second motor from the straight line is larger than a distance to the rotation axis of the first motor from the straight line.

* * * * *